US012729354B2

(12) United States Patent
Jeong et al.

(10) Patent No.: US 12,729,354 B2
(45) Date of Patent: Sep. 8, 2026

(54) BEVERAGE MAKER

(71) Applicant: LG Electronics Inc., Seoul (KR)

(72) Inventors: Yeongdon Jeong, Seoul (KR); Ahjin Sim, Seoul (KR)

(73) Assignee: LG Electronics Inc., Seoul (KR)

(*) Notice: Subject to any disclaimer, the term of this patent is extended or adjusted under 35 U.S.C. 154(b) by 635 days.

(21) Appl. No.: 18/131,238

(22) Filed: Apr. 5, 2023

(65) Prior Publication Data

US 2023/0313089 A1 Oct. 5, 2023

(30) Foreign Application Priority Data

Apr. 5, 2022 (KR) ........................ 10-2022-0042152

(51) Int. Cl.
*C12C 13/10* (2006.01)
*C12C 11/00* (2006.01)

(52) U.S. Cl.
CPC .............. *C12C 13/10* (2013.01); *C12C 11/00* (2013.01)

(58) Field of Classification Search
CPC .............. C12H 1/22; C12C 13/10; C12C 7/26
See application file for complete search history.

(56) References Cited

U.S. PATENT DOCUMENTS

2012/0189736 A1* 7/2012 Wallace .................. C12C 13/10 426/11
2017/0298311 A1* 10/2017 Pradeep ................. C12G 3/024
2019/0292499 A1* 9/2019 Park ....................... B65D 25/08
2020/0362279 A1* 11/2020 Lee .......................... C12H 1/22
2021/0040435 A1* 2/2021 Ball ....................... C12M 41/48
2023/0383219 A1* 11/2023 Yun ......................... C12C 13/10

FOREIGN PATENT DOCUMENTS

KR 20170130256 11/2017
KR 10-2020-0050277 A 5/2020
KR 10-2020-0092678 A 8/2020

OTHER PUBLICATIONS

Office Action in Korean Appln. No. 10-2022-0042152, mailed on Jul. 13, 2026, 14 pages (with English translation).

* cited by examiner

*Primary Examiner* — Woody A Lee, Jr.
(74) *Attorney, Agent, or Firm* — Fish & Richardson P.C.

(57) ABSTRACT

A system for making a beverage includes a fermentation tank, a temperature regulator configured to regulate a temperature of the fermentation tank, a beverage dispenser configured to dispense the beverage from the fermentation tank to an outside, a user interface configured to receive user input among a simple mode and an expert mode, where a beverage making time in the expert mode is less than a beverage making time in the simple mode, and a controller configured to selectively perform the simple mode and the expert mode according to the user input.

19 Claims, 12 Drawing Sheets

BEVERAGE MAKER

CROSS-REFERENCE TO RELATED APPLICATIONS

The present application claims priority under 35 U.S.C. 119 and 35 U.S.C. 365 to Korean Patent Application No. 10-2022-0042152, filed on Apr. 5, 2022, which is hereby incorporated by reference in its entirety.

BACKGROUND

Beverages are collectively referred to as drinkable liquids such as alcohol or tea. For example, beverages can be divided into various categories such as water to solve thirst, juice beverages with unique flavor and taste, refreshing beverages giving refreshing sensation, or alcoholic beverages with an alcohol effect.

A representative example of an alcoholic beverage can be a beer. The beer is an alcoholic beverage made by making a liquid (i.e., wort) of malt sprouting from barley, filtering the liquid, adding hop, and fermenting the liquid by using the yeast.

Consumers can purchase ready-made products made and sold by a beer maker or home beer (or handmade beer) made by fermenting beer ingredients at home or in a bar.

A beverage maker may easily make house beer at home or a bar, where the beverage maker may safely and conveniently make beer.

For example, a beer maker can receive from a user a beer making command through an input unit.

The beer maker can sequentially perform primary fermentation and secondary fermentation, and then perform aging. When the aging is completed, beer can be dispensed to the outside through a beer dispenser.

SUMMARY

The present application describes a system for making a beverage in which a beverage maker is configured to make a large amount of beverage.

According to one aspect of the subject matter described in this application, a system for making a beverage includes a fermentation tank configured to accommodate the beverage, a temperature regulator configured to regulate a temperature of the fermentation tank, a beverage dispenser configured to dispense the beverage from the fermentation tank to an outside of the fermentation tank, a user interface configured to receive input from a user among (i) a simple mode configured to make the beverage within a first making time and (ii) an expert mode configured to make the beverage within a second making time that is less than the first making time, and a controller configured to selectively perform the simple mode and the expert mode based on the input received through the user interface.

Implementations according to this aspect can include one or more of the following features. For example, the controller can be configured to, based on the simple mode being selected, control the beverage dispenser to dispense the beverage after a fermentation process and an aging process are sequentially performed. The controller can be configured to, based on the expert mode being selected, store the beverage in a container after the fermentation process is performed.

In some implementations, the system can include a beverage maker that includes the fermentation tank, the temperature regulator, and the beverage dispenser, where the beverage maker can be configured to make the beverage within the first making time in the simple mode and to make the beverage within the second making time in the expert mode.

In some implementations, the controller can be configured to, based on the simple mode being selected, perform a first fermentation process for a first fermentation process time, and, based on the expert mode being selected, perform a second fermentation process for a second fermentation process time that is less than the first fermentation process time.

In some implementations, the controller can be configured to, based on the simple mode being selected, perform a first fermentation process, where the first fermentation process includes performing (i) a first primary fermentation for a first primary fermentation time and (ii) a secondary fermentation for a secondary fermentation time, and, based on the expert mode being selected, perform a second fermentation process including performing a second primary fermentation for a second primary fermentation time, where the second primary fermentation time is greater than the first primary fermentation time and less than a sum of the first primary fermentation time and the secondary fermentation time.

In some implementations, the user interface can include a display configured to display a mode selection screen configured to receive the input among the simple mode and the expert mode. In some examples, the display can be configured to, based on the expert mode being selected, display a condition input screen configured to receive input of one or more conditions of the expert mode. In some examples, the display can be configured to, based on a condition for storing the beverage in a separate container being selected through the condition input screen, display a selection screen configured to receive input of whether to age the beverage in the separate container.

In some examples, the display can be configured to, based on receiving input to age the beverage in the separate container through the selection screen, display an aging help screen indicating an aging process of the beverage. In some examples, the display can be configured to, based on a confirmation menu being selected through the aging help screen, display a confirmation screen notifying the user to confirm the one or more conditions of the expert mode.

In some implementations, the one or more conditions can include a condition for storing the beverage in a beverage maker, and the display can be configured to, based on the condition for storing the beverage in the beverage maker being selected, display a confirmation screen notifying the user to confirm the one or more conditions of the expert mode.

In some implementations, the user interface can be configured to, based on a fermentation process of the expert mode being completed, display a fermentation completion screen notifying the user to transfer the beverage to a separate container. In some examples, the user interface can be configured to, based on receiving a confirmation input on the fermentation completion screen, display a dispensing guide screen indicating that the beverage is ready for dispensing.

In some implementations, the system can include a beverage maker and a mobile terminal including the user interface, where the beverage maker includes the fermentation tank, the temperature regulator, and the beverage dispenser. In some examples, the system can include a server configured to communicate with the mobile terminal and the beverage maker, where the server is configured to receive an upgrade item transmitted through the mobile terminal, and the beverage maker can be configured to receive the upgrade item from the server. In some implementations, at least one of the beverage maker, the mobile terminal, or the server includes the controller.

In some implementations, the system can include an ingredient supplier configured to accommodate one or more beverage ingredients, and a water supply configured to supply water to the ingredient supplier, where the fermentation tank is configured to receive the water through the ingredient supplier. In some examples, the system can include a plurality of channels that connect the water supply, the ingredient supplier, the fermentation tank, and the beverage dispenser. In some implementations, the system can include a plurality of valves disposed at one or more of the plurality of channels.

In some examples, the temperature regulator can include at least one of a refrigerating device or a heater.

In some implementations, a user can make the beverage using various recipes as well as pre-stored recipes.

In some implementations, since the beverage maker takes a short time to make the beverage in the expert mode, the beverage maker can make a large amount of beverage more quickly.

The details of one or more implementations are set forth in the accompanying drawings and the description below. Other features will be apparent from the description and drawings, and from the claims.

DETAILED DESCRIPTION

Hereinafter, detailed implementations of the present disclosure will be described in detail with reference to the accompanying drawings.

Although beer is exemplified as a beverage made by using a beverage maker in this specification, a kind of beverages is not limited to the beer that is capable of being made by using the beverage maker. For example, various kinds of beverages can be made through the beverage maker according to implementations.

Figure 1:
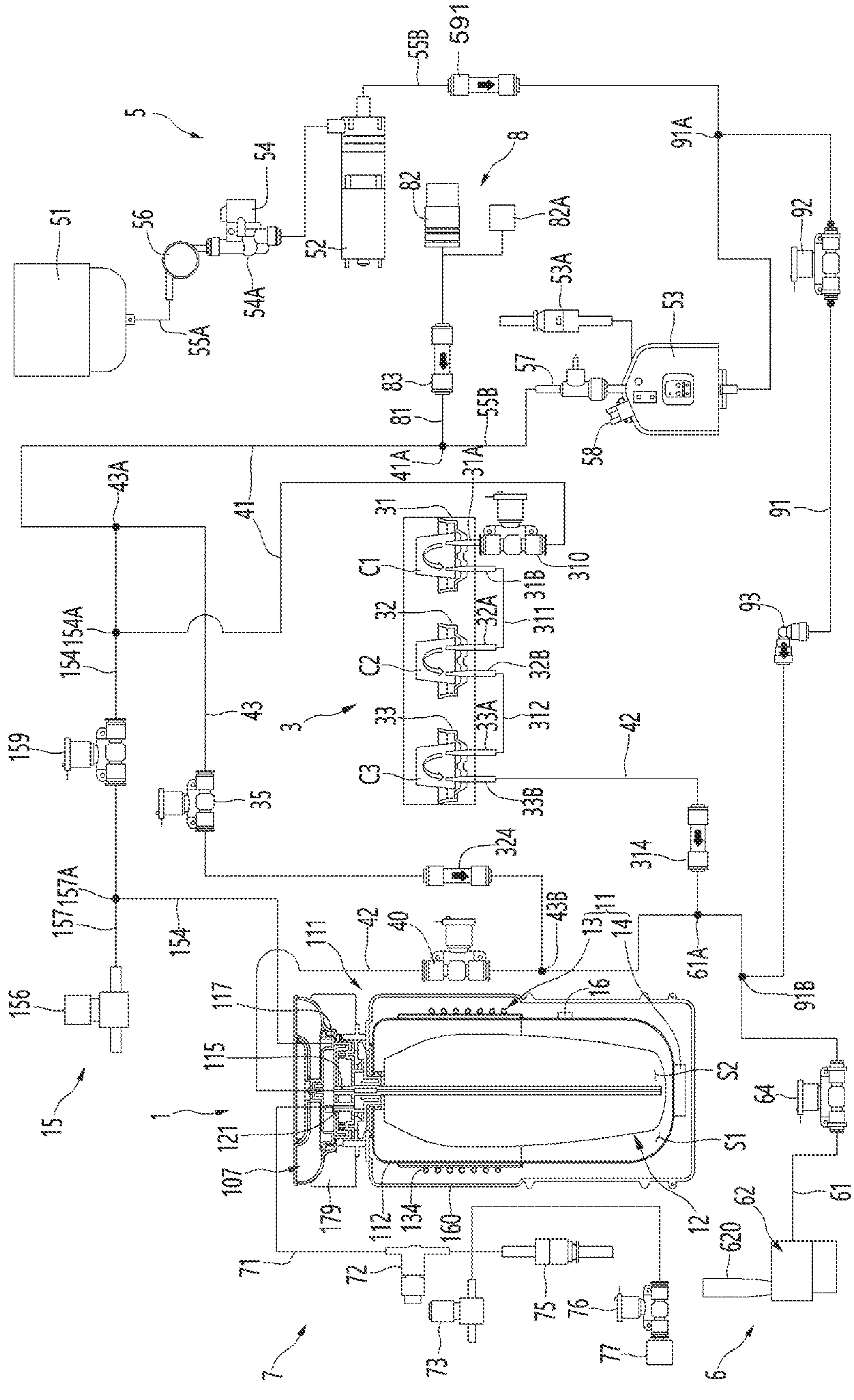
FIG. 1 is a diagram illustrating an example configuration of a beverage maker.

FIG. 1 is a perspective view showing an example of a beverage maker.

In some implementations, the beverage maker can include a fermentation module 1. A beverage can be fermented in the fermentation module 1.

The beverage maker can include a temperature controller that controls an inner temperature of the fermentation module 1.

The beverage maker can include a water supply module 5. The water supply module 5 can supply water.

The beverage maker can include ingredient supplier 3 provided with ingredient accommodating portion 31, 32, and 33 in which ingredients for making the beverage are accommodated.

The beverage maker can include main channel 41 and 42 connecting the water supply module 5 to the fermentation module 1.

The beverage maker can include a beverage dispenser 6 for dispensing the beverage made in the fermentation module 1 to the outside.

The beverage dispenser 6 can be connected to a second main channel 42. Thus, the beverage dispensed from the fermentation module 1 can be guided to the beverage dispenser 6 by passing through a portion of the second main channel 42.

The beverage maker can further include a gas discharger 7. The gas discharger 7 can be connected to the fermentation module 1 to discharge a gas generated while the beverage is made.

The beverage maker can further include an air injector for injecting air. The air injector 8 can be connected to the water supply module 5 or a first main channel 41. The air injector can include an air pump 82.

The beverage maker can further include an air controller 15 controlling a pressure between an inner wall of a fermentation tank 112 and an outer surface of a fermentation container 12.

The beverage maker can further include a sub channel 91. The sub channel 91 can connect the water supply module 5 to the beverage dispenser 6.

Hereinafter, the fermentation module 1 will be described in detail.

The fermentation module 1 can include a fermentation tank 112 having a space S1 and a fermentation lid 107 opening and closing the space S1.

The fermentation tank 112 can include a fermentation case 160 and a fermentation tank 112 accommodated in the fermentation case 160 and having the inner space S1. An insulation portion 104 can be provided between the fermentation case 160 and the fermentation tank 112. The fermentation tank 112 can further include a lid connector 105 on which the fermentation lid 107 is seated.

Each of the fermentation case 160 and the fermentation tank 112 can be provided as an assembly of a plurality of members. The fermentation case 160 can define an outer appearance of the fermentation tank 112.

The fermentation lid 107 can seal the inside of the fermentation tank 112 and be disposed on the fermentation tank 112 to cover the opening S1. A main channel, particularly, a main channel connecting portion 115 connected to a second main channel 42 can be provided in the fermentation lid 107.

A fermentation container 12 can be accommodated in the fermentation tank 112.

The fermentation container 12 can be provided as a separate container so that the beverage ingredients and the made beverage stain an inner wall of the fermentation tank 112. The fermentation container 12 can be separably disposed on the fermentation tank 112. The fermentation container 12 can be seated on the fermentation tank 112 to ferment the beverage within the fermentation tank 112. After the fermentation container 12 is used, the fermentation container 12 can be withdrawn to the outside of the fermentation tank 112.

The fermentation container 12 can be a pack containing the ingredients for making the beverage. The fermentation container 12 can be made of a flexible material. Thus, the fermentation container 12 can be easily inserted into the fermentation tank 112 and be contracted and expanded by a pressure. However, the implementations may not be limited thereto. For example, the fermentation container 12 can be made of a polyethylene terephthalate (PET) material.

The fermentation container 12 can have a beverage making space S2 in which the beverage ingredients are accommodated, and the beverage is made. The fermentation container 12 can have a size less than that of the inner space S1 of the fermentation tank 112.

The fermentation container 12 can be inserted and accommodated into the fermentation tank 112 in the state in which the ingredients are contained in the fermentation container 12. The fermentation container 12 can be inserted into the fermentation tank 112 and then accommodated in the fermentation tank 112 in the state in which the fermentation lid 107 is opened.

The fermentation lid 107 can seal the fermentation tank 112 after the fermentation container 12 is inserted into the fermentation tank 112. The fermentation container 12 can assist the fermentation of the ingredient in the state in which the fermentation container 12 is accommodated in the space S1 that is sealed by the fermentation tank 112 and the fermentation lid 107. The fermentation container 12 can be expanded by the pressure therein during the making of the beverage. The fermentation container 12 can be pressed by the air within the fermentation tank 112 when the beverage contained in the fermentation container 12 is dispensed, and the air is supplied between an inner surface of the fermentation tank 112 and the fermentation container 12.

The fermentation tank 112 can be disposed in the fermentation case 160. The fermentation tank 112 can have an outer circumference surface and a bottom surface, which are spaced apart from the inner surface of the fermentation case 160. In more detail, the outer circumference the fermentation tank 112 can be spaced apart from an inner circumference of the fermentation case 160, and an outer bottom surface of the fermentation tank 112 can be spaced apart from an inner bottom surface of the fermentation case 160.

The insulation portion can be provided between the fermentation case 160 and the fermentation tank 112. The insulation portion can be disposed in the fermentation case 160 to surround the fermentation tank 112. Thus, the fermentation tank 112 can be constantly maintained in temperature.

The insulation portion can be made of a material such as foamed polystyrene or polyurethane which has high thermal insulating performance and absorbs vibration.

The fermentation tank 112 can include a temperature sensor 16 for measuring the temperature of the fermentation tank 112.

The temperature sensor 16 can be mounted on a circumferential surface of the fermentation tank 112. The temperature sensor 16 can be disposed below an evaporator 134 wound around the fermentation tank 112.

Hereinafter, the temperature controller 11 will be described in detail.

The temperature controller 11 can change an inner temperature of the fermentation tank 112. In more detail, the temperature controller 11 can change a temperature of the fermentation tank 112.

The temperature controller 11 can heat or cool the fermentation tank 102 to control a temperature of the fermentation tank 102 at an optimal temperature for fermenting the beverage.

The temperature controller 11 can include at least one of a refrigerant cycle device 13 and a heater 14. However, the implementations may not be limited thereto. For example, the temperature controller 11 can include a thermoelement TEM.

The refrigerant cycle device 13 can control the fermentation tank 112 to adjust a temperature of the fermentation tank 112. The refrigerant cycle device 13 can include a compressor, a condenser, an expansion mechanism (e.g., expansion valve), and an evaporator 134.

The evaporator 134 can be disposed to contact an outer surface of the fermentation tank 102. The evaporator 134 can be provided as an evaporation tube wound around an outer surface of the fermentation tank 112. The evaporator 134 can be accommodated between the fermentation tank 112 and the insulation portion to cool the fermentation tank 112 that is insulated by the insulation portion.

The temperature controller 11 can further include a heater 14 heating the fermentation tank 112. The heater 14 can be installed to contact the bottom surface of the fermentation tank 112. The heater 14 can be provided as a heat generation heater that generates heat when power is applied. The heater 14 can be provided as a plate heater.

Thus, the natural convection of a fluid can be generated inside the fermentation tank 112 by the evaporator 134 and the heater 14, and temperature distribution inside the fermentation tank 112 and the fermentation container 12 can be uniform.

Hereinafter, the main channel 41 and 42 and a bypass channel 43 will be described.

As described above, the main channel 41 and 42 can include a first main channel 41 connecting the water supply module 5 to the ingredient supplier 3 and a second main channel 42 connecting the ingredient supplier 3 to the fermentation module 1.

That is, the first main channel 41 can guide water supplied from the water supply module 5 to the ingredient supplier 3, and the second main channel 42 can guide the mixture of the ingredients and the water, which are extracted from the ingredient supplier 3, to the fermentation module 1.

The first main channel 41 can have one end 41A connected to the water supply module 5 and the other end connected to the ingredient supplier 3, more particularly, an inlet of an initial ingredient accommodating portion 31, which will be described below in more detail.

An ingredient supply valve 310 opening and closing the first main channel 41 can be installed in the first main channel 41. The ingredient supply valve 310 can be provided in the ingredient supplier 3.

The ingredient supply valve 310 can be opened when additives accommodated in the ingredient accommodating portions 31, 32, and 33 are put to open the first main channel 41. The ingredient supply valve 310 can be opened when the ingredient accommodating portions 31, 32, and 33 are cleaned to open the first main channel 41.

The second main channel 42 can have one end connected to a main channel connecting portion 115 of the fermentation module 1 and the other end connected to the ingredient supplier 3, more particularly, an outlet 33B of a final ingredient accommodating portion 33, which will be described below in more detail.

A main valve 40 opening and closing the second main channel 42 can be installed in the second main channel 42. Also, a main check valve 314 for allowing the fluid to flow from the ingredient supplier 3 to the fermentation module 1 can be installed in the second main channel 42. That is, the main check valve 314 can prevent the fluid from flowing back to the ingredient supplier 3.

The main check valve 314 can be disposed between the main valve 40 and the ingredient supplier 3 with respect to the second main channel 42.

The main valve 40 can be opened when the water is supplied to the fermentation container 12 to open the second main channel 42. The main valve 40 can be closed while the fermentation tank 112 is cooled to close the second main channel 42. The main valve 40 can be opened when the air is injected into the fermentation container 12 to open the second main channel 42. The main valve 40 can be opened when the additives are supplied into the fermentation container 12 to open the second main channel 42. The main valve 40 can be closed to seal the inside of the fermentation container 12 during the fermentation of the ingredients. The main valve 40 can be closed to seal the inside of the fermentation container 12 when the beverage is aged and stored. The main valve 40 can be opened when the beverage is dispensed by the beverage dispenser 6 to open the second main channel 4. The beverage within the fermentation container 12 can pass through the main valve 40 to flow to the beverage dispenser 6.

The main channels 41 and 42 can be provided as one continuous channel when the beverage maker does not include the ingredient supplier 3.

When the beverage maker includes the ingredient supplier 3, the beverage maker can further include a bypass channel 43 configured to allow the water or the air to bypass the ingredient accommodating portions 31 and 32.

The bypass channel 43 can bypass the ingredient accommodating portions 31, 32, and 33 and then be connected to the first main channel 41 and the second main channel 42.

The bypass channel 43 can have one end connected to the first main channel 41 and the other end connected to the second main channel 42. In more detail, the bypass channel 43 can have one end 43A connected to the first main channel 41 between the water supply module 5 and the ingredient supply valve 310 and the other end 43B connected to the second main channel 42 between the main valve 40 and the ingredient supplier 3.

A bypass valve 35 opening and closing the bypass channel 43 can be installed in the bypass channel 43.

The bypass valve 35 can be opened when the water supplied from the water supply module 5 is supplied to the fermentation container 12 to open the bypass channel 43. The bypass valve 35 can be opened when the air injected from the air injector 8 is supplied to the fermentation container 12 to open the bypass channel 43. The bypass valve 35 can be opened when the bypass channel 43 is cleaned to open the bypass channel 43.

Also, a bypass check valve 324 allowing the fluid to flow from the first main channel 41 to the second main channel 42 can be installed in the bypass channel 43. That is, the fluid can flow only from the first main channel 41 to the second main channel 42 but may not flow in the opposite direction.

The bypass check valve 324 can be disposed between the bypass valve 35 and the second main channel 42 with respect to the bypass channel 43.

Hereinafter, the ingredient supplier 3 will be described in detail.

When beer is made by using the beverage maker, the ingredients for making the beer can include water, malt, yeast, hop, flavoring additives, and the like.

The beverage maker can include all of the ingredient supplier 3 and the fermentation container 12. The ingredients for making the beverage can be accommodated to be divided into the ingredient supplier and fermentation container 12. A portion of the ingredients for making the beverage can be accommodated in the fermentation container 12, and the remaining ingredients can be accommodated in the ingredient supplier 3. The remaining ingredients accommodated in the ingredient supplier 3 can be supplied to the fermentation container 12 together with the water supplied from the water supply module 5 and mixed with the portion of the ingredients accommodated in the fermentation container 12.

A main ingredient that is essential for making the beverage can be accommodated in the fermentation container 12, and the additives added to the main ingredient can be accommodated in the ingredient supplier 3. In this case, the additives accommodated in the ingredient supplier 3 can be mixed with the water supplied from the water supply module 5 and supplied to the fermentation container 12 and then be mixed with the main ingredient accommodated in the fermentation container 12.

The main ingredient accommodated in the fermentation container 12 can have a capacity greater than that of other ingredients. For example, when the beer is made, the main material can be the malt of the malt, the yeast, the hop, and the flavoring additives. Also, the additive accommodated in the ingredient supplier 3 can be the other ingredient except for the malt of the ingredient for making the beer, for example, the yeast, the hop, and the flavoring additives.

The beverage maker may not include the ingredient supplier 3 but include the fermentation container 12. In this case, the main ingredient can be accommodated in the fermentation container 12, and the user can directly put the additives into the fermentation container 12.

If the beverage maker includes all the ingredient supplier 3 and the fermentation container 12, the beverage can be more easily made. Hereinafter, the case in which the beverage maker includes all of the ingredient supplier 3 and the fermentation container, will be described as an example. However, the implementations may not be limited to the case in which the beverage maker includes all of the ingredient supplier 3 and the fermentation container 12.

The ingredients within the fermentation container 12 can be fermented as time elapses, and the beverage made in the fermentation container 12 can flow to the second main channel 42 through the main channel connecting portion 115 and also flow from the second main channel 42 to the beverage dispenser 6 so as to be dispensed.

The ingredients that are necessary for making the beverage can be accommodated in the ingredient supplier 3, and the water supplied from the water supply module 5 can pass through ingredient supplier 3. For example, when the beverage made in the beverage maker is beer, the ingredient accommodated in the ingredient supplier 3 can be yeast, hop, flavoring additives, and the like.

The ingredient accommodated in the ingredient supplier 3 can be directly accommodated into an ingredient accommodating portions 31, 32, and 33 provided in the ingredient supplier 3. At least one ingredient accommodating portion 31, 32, and 33 can be provided in the ingredient supplier 3. The plurality of ingredient accommodating portions 31, 32, and 33 can be provided in the ingredient supplier. In this case, the ingredient accommodating portions 31, 32, and 33 can be partitioned with respect to each other.

Inlets 31A, 32A, and 33A through which the fluid is introduced and outlets 31B, 32B, and 33B through which the fluid is discharged can be provided in the ingredient accommodating portions 31, 32, and 33, respectively. The fluid introduced into the inlet of one ingredient accommodating portion can be mixed with the ingredients within the ingredient accommodating portions and then discharged through the outlet.

The ingredients accommodated in the ingredient supplier 3 can be accommodated in capsule C1, C2, and C3. In this case, the capsule C1, C2, and C3 can be accommodated in the ingredient accommodating portion 31, 32, and 33, and the ingredient accommodating portion 31, 32, and 33 can be called a capsule mounting portion.

When the ingredients are accommodated in the capsules C1, C2, and C3, the ingredient supplier 3 can be configured so that the capsules C1, C2, and C3 are seated and withdrawn. The ingredient supplier can be provided as a capsule kit assembly in which the capsules C1, C2, and C3 are separably accommodated.

For example, a first additive, a second additive, and a third additive can be accommodated in the ingredient supplier 3.

The first additive can be yeast, the second additive can be hop, and the third additive can be a flavoring additive. The ingredient supplier 3 can include a first capsule mounting portion 31 in which a first capsule C1 containing the first additive is accommodated, a second capsule mounting portion 32 in which a second capsule C2 containing the second additive is accommodated, and a third capsule mounting portion 33 in which a third capsule C3 containing the third additive is accommodated.

The ingredients contained in the ingredient accommodating portion or the capsules C1, C2, and C3 can be extracted by a water pressure of the water supplied from the water supply module 5.

When the ingredients are extracted by the water pressure, the water supplied from the water supply module 5 to the first main channel 41 can pass through the ingredient accommodating portion or the capsules C1, C2, and C3 and then be mixed with the ingredients, and the ingredients accommodated in the ingredient accommodating portion or the capsules C1, C2, and C3 can flow to the second main channel together with the water.

A plurality of additives different from each other can be accommodated to be divided in the ingredient supplier 3. For example, when the beer is made, the plurality of additives accommodated in the ingredient supplier 3 can be the yeast, the hop, and the flavoring additive, which are accommodated to be divided from each other.

When the plurality of ingredient accommodating portions are provided in the ingredient supplier 3, the plurality of ingredient accommodating portions 31, 32, and 33 can be connected in series to each other in a flow direction of the water.

In more detail, the ingredient supplier 3 can include at least one connecting channel 311 and 312 connecting the outlet of one ingredient accommodating portion of the plurality of ingredient accommodating portions 31, 32, and 33 to the inlet of the other ingredient accommodating portion.

Also, the plurality of ingredient accommodating portions 31, 32, and 33 can include an initial ingredient accommodating portion 31 and a final ingredient accommodating portion 33. The plurality of ingredient accommodating portions 31, 32, and 333 can further include an intermediate ingredient accommodating portion 32.

The inlet 31A of the initial ingredient accommodating portion 31 can be connected to the first main channel 41, and the outlet 33B of the final ingredient accommodating portion 33 can be connected to the second main channel 42.

The intermediate ingredient accommodating portion 32 can be disposed between the first ingredient accommodating portion 31 and the third ingredient accommodating portion 33 in the flow direction of the fluid. The inlet 32A and the outlet 32B of the intermediate ingredient accommodating portion 32 can be connected to the connecting channels 311 and 312 different from each other.

Figure 2:
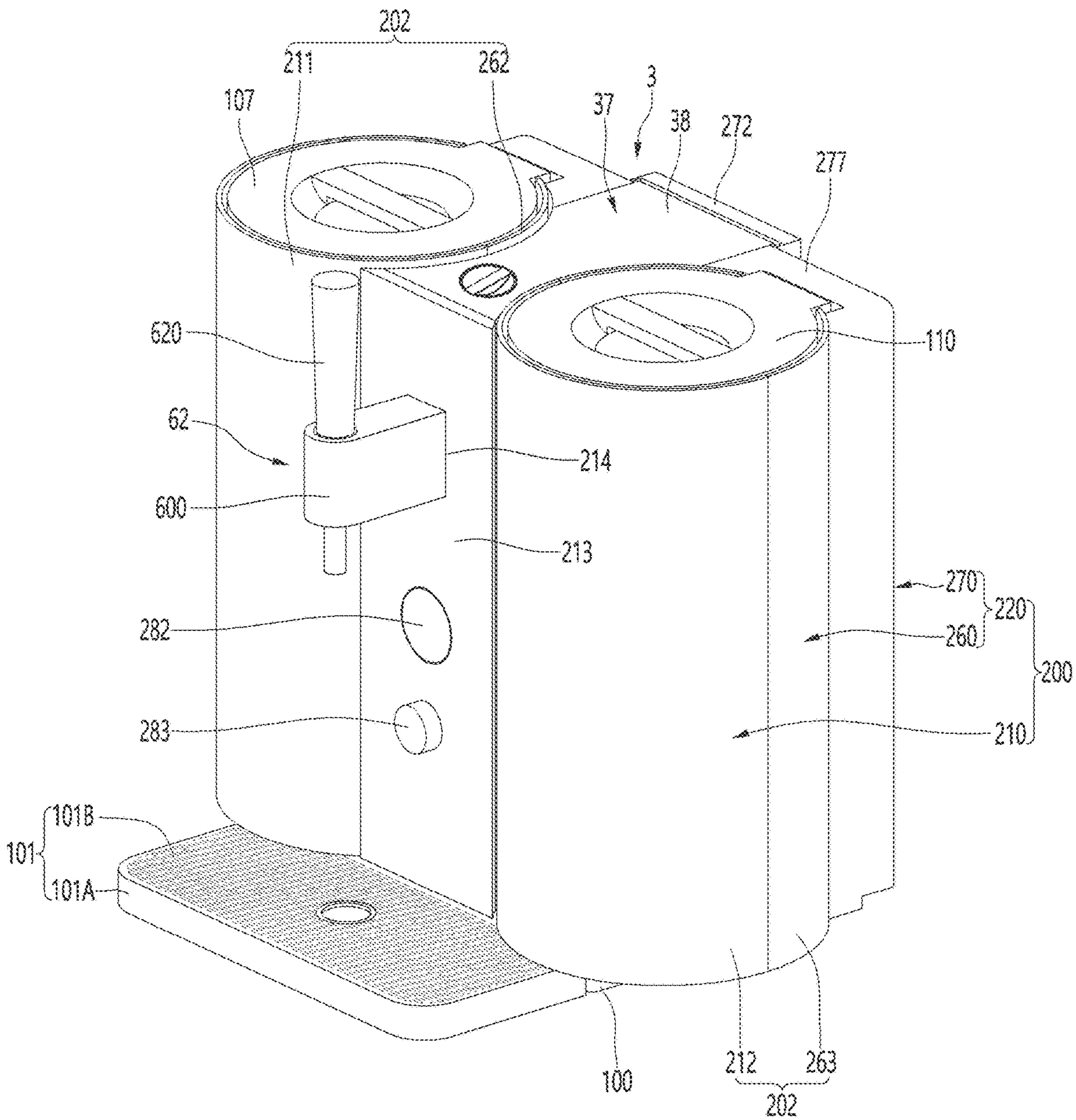
FIG. 2 is a perspective view showing the beverage maker.

As illustrated in FIG. 2, when three ingredient accommodating portions are provided in the ingredient supplier 3, the outlet 31B of the final ingredient accommodating portion 31 can be connected to the inlet 32A of the intermediate ingredient accommodating portion 32 through the first connecting channel 311, and the outlet 32B of the intermediate ingredient accommodating portion 32 can be connected to the inlet 33A of the final ingredient accommodating portion 33 through the second connecting channel 312.

In this case, the water introduced into the inlet 31A of the final ingredient accommodating portion 31 through the first main channel 41 can flow to the first connecting channel 311 through the outlet 31B together with the first additive accommodated in the initial ingredient accommodating portion 31.

The fluid (the mixture of the water and the first additive) introduced into the inlet 32A of the intermediate ingredient accommodating portion 32 through the first main channel 41 can flow to the second connecting channel 312 through the outlet 32B together with the second additive accommodated in the intermediate ingredient accommodating portion 32.

The fluid (the mixture of the water and the first and second additives) introduced into the inlet 33A of the final ingredient accommodating portion 33 through the second main channel 42 can flow to the second main channel 42 through the outlet 33B together with the third additive accommodated in the final ingredient accommodating portion 33.

The fluid (the mixture of the water and the first, second, and third additives) discharged through the second main channel 42 can be guided to the main channel connecting portion 115 of the fermentation module 1 and then introduced into the fermentation container 12.

However, the configuration of the ingredient supplier is not limited thereto. For example, when the intermediate ingredient accommodating portion is not provided, two ingredient accommodating portions can be provided in the ingredient supplier 3. In this case, one ingredient accommodating portion can be the initial ingredient accommodating portion, and the other ingredient accommodating portion can be the final ingredient accommodating portion. The outlet of the initial ingredient accommodating portion and the inlet of the final ingredient accommodating portion can be connected to each other by the connecting channel.

For another example, when the intermediate ingredient accommodating portion is provided in plurality, four or more ingredient accommodating portions can be provided in the ingredient supplier 3. In this case, one ingredient accommodating portion can be the initial ingredient accommodating portion, the other ingredient accommodating portion can be the final ingredient accommodating portion, and the remaining ingredient accommodating portion can be the intermediate ingredient accommodating portion. In this case, since the connection between the ingredient accommodating portions in series is easily understood by the person skilled in the art, their detailed descriptions will be omitted.

Since the plurality of ingredient accommodating portions 31, 32, and 33 are connected in series to each other, the channel configuration of the ingredient supplier 3 can be simplified.

Also, since the additives contained in the capsules C1, C2, and C3 are extracted at once, a time taken to extract the additives can decrease. Also, since the user does not have to worry about the mounting order of the capsules C1, C2, and C3, malfunction due to the mounting of the capsules C1, C2, and C3 in erroneous order may not occur. Also, the ingredient supplier 3 can be minimized in water leakage point to improve reliability.

When the ingredients accommodated in the ingredient supplier 3 are accommodated in the capsules C1, C2, and C3, the initial ingredient accommodating portion 31 can be called an initial capsule mounting portion, the intermediate ingredient accommodating portion 32 can be called an intermediate capsule mounting portion, and the final ingredient accommodating portion 33 can be a final capsule mounting portion.

Hereinafter, the water supply module 5 will be described in detail.

The water supply module 5 can include a water tank 51, a water supply pump 52 for pumping water within the water tank 51, and a water supply heater 53 for heating the water pumped by the water supply pump 52.

The water supply module 5 can further include the water supply pump 52 for pumping water within the water tank 51 and the water supply heater 53 for heating the water pumped by the water supply pump 52.

The water tank 51 and the water supply pump 52 can be connected to a water tank discharge channel 55A, and the water contained in the water tank 51 can be introduced into the water supply pump 52 through the water tank discharge channel 55A.

The water supply pump 52 and one end of the first main channel 41 can be connected to a water supply channel 55B, and the water discharged from the water supply pump can be guided to the first main channel 41 through the water supply channel 55B.

A flow meter 56 for measuring a flow rate of the water discharged from the water tank 51 can be installed in the water tank discharge channel 55A.

Also, a flow rate control valve 54 for controlling the flow rate of the water discharged from the water tank 51 can be installed in the water tank discharge channel 55A. The flow rate control valve 54 can include a step-in motor.

Also, a thermistor 54A for measuring a temperature of the water discharged from the water tank 51 can be installed in the water tank discharge channel 55A. The thermistor 54A can be built in the flow rate control valve 54.

A water supply check valve 591 for preventing the water from flow back to the water supply pump 52 can be installed in the water supply channel 55B.

The water supply heater 53 can be installed in the water supply channel 55B.

The water supply heater 53 can be a mold heater and include a heater case through which the water pumped by the water supply pump 52 passes and a heat generation heater installed in the heater case to heat the water introduced into the heater case.

A thermal fuse 58 for interrupting a circuit to cutoff current applied to the water supply heater 53 when a temperature is high can be installed in the water supply heater 53.

The water supply module 5 can further include a safety valve 53A. The safety valve 53A can communicate with the inside of the heater case of the water supply heater 53. The safety valve 53A can restrict a maximum internal pressure of the heater case. For example, the safety valve 53A can restrict a maximum internal pressure of the heater case to a pressure of about 3.0 bar.

The water supply module 5 can further include a water supply temperature sensor 57 for measuring a temperature of the water passing through the water supply heater 53. The water supply temperature sensor 57 can be installed in the water supply heater 53. Alternatively, the water supply temperature sensor 57 can be disposed at a portion of the water supply channel 55B behind the water supply heater 53 in the flow direction of the water. Also, the water supply temperature sensor 57 can be installed in the first main channel 41.

When the water supply pump 52 is driven, the water within the water tank 51 can be introduced into the water supply pump 52 through the water tank discharge channel 55A, and the water discharged from the water supply pump 52 can be heated in the water supply heater 53 while flowing through the water supply channel 55B and then be guided to the first main channel 41.

Hereinafter, the beverage dispenser 6 will be described.

The beverage dispenser 6 can be connected to the second main channel 42.

In more detail, the beverage dispenser 6 can include a dispenser 62 for dispensing the beverage and a beverage dispensing channel 61 connecting to the dispenser 62 to the second main channel 42.

The beverage dispensing channel 61 can have one end 61A connected between the main check valve 314 and the main valve 40 with respect to the second main channel 42 and the other end connected to the dispenser 62.

A beverage dispensing valve 64 opening and closing the beverage dispensing channel 61 can be installed in the beverage dispensing channel 61.

The beverage dispensing valve 64 can be opened when the beverage is dispensed to open the beverage dispensing channel 61. The beverage dispensing valve 64 can be opened when residual water is removed to open the beverage dispensing channel 61. The beverage dispensing valve 64 can be opened when the beverage dispenser is cleaned to open the beverage dispensing channel 61.

An anti-foaming member can be provided in the beverage dispensing channel 61, and an amount of foam of the beverage flowing from the second main channel 42 to the beverage dispensing channel 61 can be minimized while passing through the anti-foaming part. A mesh for filtering the foam can be provided in the anti-foaming member.

When the beverage is dispensed, the beverage dispensing valve 64 can be opened. When the beverage is not dispensed, the closed state of the beverage dispensing valve 64 can be maintained.

Hereinafter, the gas discharger 7 will be described in detail.

The gas discharger 7 can be connected to the fermentation module 1 to discharge a gas generated in the fermentation container 12.

In more detail, the gas discharger 7 can include a gas discharge channel 71 connected to the fermentation module, a gas pressure sensor 72 installed in the gas discharge channel 71, and a gas discharge valve 73 connected behind the gas pressure sensor 72 in the gas discharge channel 71 in the gas discharge direction.

The gas discharge channel 71 can be connected to the fermentation module 1, particularly, the fermentation lid 107. A gas discharge channel connecting portion 121 to which the gas discharge channel 71 is connected can be provided in the fermentation lid 107.

The gas within the fermentation container 12 can flow into the gas discharge channel 71 and the gas pressure sensor 72 through the gas discharge channel connecting portion 121. The gas pressure sensor 72 can detect a pressure of the gas discharged to the gas discharge channel 71 through the gas discharge channel connecting portion 121 within the fermentation container 12.

The gas discharge valve 73 can be turned to be opened when the air is injected into the fermentation container 12 by the air injector 8. The beverage maker can uniformly mix the malt with the water by injecting the air into the fermentation container 12. Here, foam generated in the liquid malt can be discharged from the upper portion of the fermentation container 12 to the outside through the gas discharge channel 71 and the gas discharge valve 73.

The gas discharge valve 73 can be turned on to detect fermentation during the fermentation process and then tuned off to be closed.

The gas discharger 7 can further include the safety valve 75 connected to the gas discharge channel 71. The safety valve 75 can be connected behind the gas pressure sensor 72 in the gas discharge channel 71 in the gas discharge direction. The safety valve 75 can restrict a maximum pressure of the fermentation container 12 and the gas discharge channel 71. For example, the safety valve 75 can restrict the maximum pressure of the fermentation container 12 and the gas discharge channel 71 to a pressure of about 3.0 bar.

The gas discharger 7 can further include a pressure release valve 76.

The pressure release valve 76 can be connected to the gas discharge channel 71. The pressure release valve 76 and the gas discharge valve 73 can be selectively opened/closed.

The gas discharge channel 71 can be branched to be respectively connected to the gas discharge valve 73 and the pressure release valve 76.

A noise reducing device 77 can be mounted on the pressure release valve 76. The noise reducing device 77 can include at least one of an orifice structure and a muffler structure.

Even though the pressure release valve 76 is opened, the internal pressure of the fermentation container 12 can gradually decrease by the noise reducing device 77.

When the fermentation of the beverage progresses, the pressure release valve 76 can be opened to release the pressure in the state in which the internal pressure of the fermentation container 12 increases. The noise reducing device 77 can effectively reduce noise generated due to a difference in pressure of the inside and outside of the fermentation container 12.

The pressure release valve 76 can be controlled to be opened/closed while the beverage ingredients are fermented.

Hereinafter, the air injector 8 will be described.

The air injector 8 can be connected to the water supply channel 55B or the first main channel 41 to inject air. Hereinafter, for convenience of description, the case in which the air injector 8 is connected to the water supply channel 55B will be described as an example.

The air injector 8 can be connected to an opposite side of a sub channel 91, which will be described later, with respect to the water supply heater 53.

In this case, the air injected into the air injector 8 can pass through the water supply heater 53 to flow to the sub channel 91 together with the residual water within the water supply heater 53. Thus, the residual water within the water supply heater 53 can be removed to maintain a clean state of the water supply heater 53.

Alternatively, the air injected from the air injector 8 to the first main channel 41 can successively pass through the bypass channel 43 and the second main channel 42 and then be injected into the fermentation container 12. Thus, stirring or aeration can be performed in the fermentation container 12.

Alternatively, the air injected from the air injector 8 to the first main channel 41 can be guided to the ingredient supplier 3 to flow to the capsule mounting portions 31, 32, and 33. The residual water or residues within the capsules C1, C2, and C3 or the capsule mounting portions 31, 32, and 33 can flow the second main channel 42 by the air injected by the air injector 8. The capsules C1, C2, and C3 and the capsule mounting portions 31, 32, and 33 can be cleanly maintained by the air injected by the air injector 8.

The air injector 8 can include an air injection channel connected to the water supply channel 55B or the first main channel 41 and an air pump 82 connected to the air injection channel 81. The air pump 82 can pump the air to the air injection channel 81.

An air injection check valve 83 preventing the water flowing to the water supply channel 55B by the water supply pump 52 from being introduced into the air pump 82 through the air injection channel 81 can be installed in the air injection channel 81.

The air injector 8 can further include an air filter 82A. The air filter 82A can be provided in a suction side of the air pump 82, and thus, external air can be suctioned into the air pump 82 by passing through the air filter 82A. Thus, the air pump 82 can inject clean air into the air injection channel 81.

Hereinafter, the air controller 15 will be described in detail.

The air controller 15 can control a pressure between an inner wall of the fermentation tank 112 and an outer surface of the fermentation container 12.

The air controller 15 can supply air into a space between the fermentation container 12 and the fermentation tank 112. In some examples, the air controller 15 can exhaust the air within the space between the fermentation container 12 and the fermentation tank 112 to the outside.

The air controller 15 can include an air supply channel 154 connected to the fermentation module 1 and an exhaust channel 157 connected to the air supply channel 154 to exhaust the air to the outside.

The air supply channel 154 can have one end connected to the first main channel 41 and the other end connected to the fermentation module 1.

The air supply channel 154 can be connected to the fermentation module 1, particularly, the fermentation lid 107. An air supply channel connecting portion 117 to which the air supply channel 154 is connected can be provided in the fermentation module 1. The air supply channel connecting portion 117 can communicate with the space between the inner wall of the fermentation tank 112 and the outer surface of the fermentation container 12.

The air injected from the air injector 8 to the first main channel 41 can be guided between the outer surface of the fermentation container 12 and the inner wall of the fermentation tank 112 through the air supply channel 154.

The air injector 8 can function as an air supplier for supplying the air into the space between the fermentation container 12 and the fermentation tank 112 together with the air supply channel 154.

As described above, the air supplied into the fermentation tank 112 can press the fermentation container 12 between the outer surface of the fermentation container 12 and the inner wall of the fermentation tank 112.

The beverage within the fermentation container 12 can be pressed by the fermentation container 12 that is pushed by the air. When the main valve 40 and the beverage dispensing valve 64 are opened, the beverage can pass through the main channel connecting portion 115 to flow the second main channel 42. The beverage flowing from the fermentation container 12 to the second main channel 42 can be dispensed to the outside through the beverage dispenser 6.

The air pump 82 can supply air so that a predetermined pressure occurs between the fermentation container 12 and the fermentation tank 112. Thus, a pressure at which the beverage within the fermentation container 12 is easily dispensed can be occur between the fermentation container 12 and the fermentation tank 112.

The air pump 82 can be maintained in the turn-off state while the beverage is dispensed. When the beverage is completely dispensed, the air pump 82 can be driven for next beverage dispensing and then stopped.

Thus, when the beverage is completely made, he beverage maker can dispense the beverage within the fermentation container 12 to the beverage dispenser 6 in the state in which the fermentation container 12 is disposed within the fermentation module 1 without withdrawing the fermentation container 12 to the outside of the fermentation module 1.

The air controller 15 can include a separate air supply pump with respect to the air injector 8. In this case, the air supply channel 154 can be connected to the air supply pump, but may not connected to the first main channel 41. However, the injection of the air into the fermentation container 12 by the air pump 82 and the supplying of the air into the space between the fermentation container 12 and the fermentation tank 112 can be combined with each other to realize a compact product and reduce a manufacturing cost.

The exhaust channel 157 can function as an air exhaust passage, through which the air between the fermentation container 12 and the fermentation tank 112 is exhausted to the outside, together with a portion of the air supply channel 154.

The exhaust channel 157 can be disposed outside the fermentation module 1. The exhaust channel 157 can be connected to a portion of the air supply channel 154, which is disposed outside the fermentation tank 112.

The air supply channel 154 can include a first channel connected between a connecting portion 157A connected to the first main channel 41 and the exhaust channel 157 and a second channel connected between the connecting portion 154A connected to the exhaust channel 157 and the air supply channel connecting portion 117. The first channel can be an air supply channel for guiding the air pumped by the air pump 82 to the second channel. Also, the second channel can be an air supply and exhaust-combined channel for supplying the air passing through the air supply channel into the space between the fermentation tank 112 and the fermentation container 12 or guiding the air discharged from the space between the fermentation tank 112 and the fermentation container 12 to the exhaust channel 157.

The exhaust channel 157 can be connected to the exhaust valve 156 for opening and closing the exhaust channel 157.

The exhaust valve 156 can be opened so that the air between the fermentation container 12 and the fermentation tank 112 is exhausted to the outside when the fermentation container 12 is expanded while the beverage is made. The exhaust valve 156 can be controlled to be opened when the water is supplied by the water supply module 5. The exhaust valve 156 can be controlled to be opened when the air is injected by the air injector 8.

The exhaust valve 156 can be opened so that the air between the fermentation container 12 and the fermentation tank 112 is exhausted when the beverage within the fermentation container 12 is completely dispensed. The user can take the fermentation container out of the fermentation tank 112 when the beverage is completely dispensed. This is done because safety accidents occur when the inside of the fermentation tank 112 is maintained at a high pressure. The exhaust valve 156 can be controlled to be opened when the beverage within the fermentation container 12 is completely dispensed.

The air controller 15 can further include an air supply valve 159 that restricts the air pumped by the air pump 82 and supplied between the fermentation container 12 and the fermentation tank 112.

The air supply valve 159 can be installed in the air supply channel 154. In more detail, the air supply valve 159 can be installed between the connecting portion 154A of the first main channel 41 and the connecting portion 157A of the exhaust channel 157 in the air supply channel 154.

Hereinafter, the sub channel 91 will be described in detail.

The sub channel 91 can connect the water supply module 5 to the beverage dispenser 6. In more detail, the sub channel 91 can have one end 91A connected to the water supply channel 55B and the other end 91B connected to the beverage dispensing channel 61.

The sub channel 91 can be connected between the water supply pump 52 and the water supply heater 53 with respect to the water supply channel 55B.

Also, the sub channel 91 can be connected to the connecting portion 61A of the second main channel 42 and the beverage dispensing valve 64 with respect to the beverage dispensing channel 61.

The water supplied by the water supply pump 52 and the air pumped by the air pump 82 can be guided to the beverage dispensing channel 61 through the sub channel 91 and then be dispensed to the dispenser 62. Thus, the residual water or the beverage remaining in the beverage dispenser 6 can be removed.

A sub valve 92 opening and closing the sub channel 91 can be installed in the sub channel 91.

The sub valve 92 can be opened when the beverage is dispensed, or the cleaning is performed to open the sub channel 91.

Also, a sub check valve 93 for preventing the beverage of the beverage dispensing channel 61 from flowing back to the water supply module 5 can be installed in the sub channel 91. The sub check valve 93 can be disposed between the sub valve 92 and the beverage dispensing channel 61 with respect to the sub channel 91.

The sub channel 91 can function as a residual water removing channel of the water supply module 5. For example, when the air pump 82 is turned on in the state in which the air supply valve 159, the bypass valve 35, and the ingredient supply valve 310 are closed, the sub valve 92 is opened, the air injected into the air injection channel 81 can pass through the water supply heater 53 to flow to the sub channel 91. Then, the air can pass through the sub valve 92 to flow to the beverage dispensing channel 61 and then be dispensed to the dispenser 62. In this process, the air can be dispensed together with the water supply module 5, more particularly, the residual water remaining the water supply heater 53 and the water supply channel 55B so that residual water is removed.

In addition, the sub channel 91 can function as a cleaning channel. This will be described in detail in cleaning steps S100 and S1100 and a dispenser cleaning process of a beverage dispensing step S1000, which will be described later.

Figure 3:
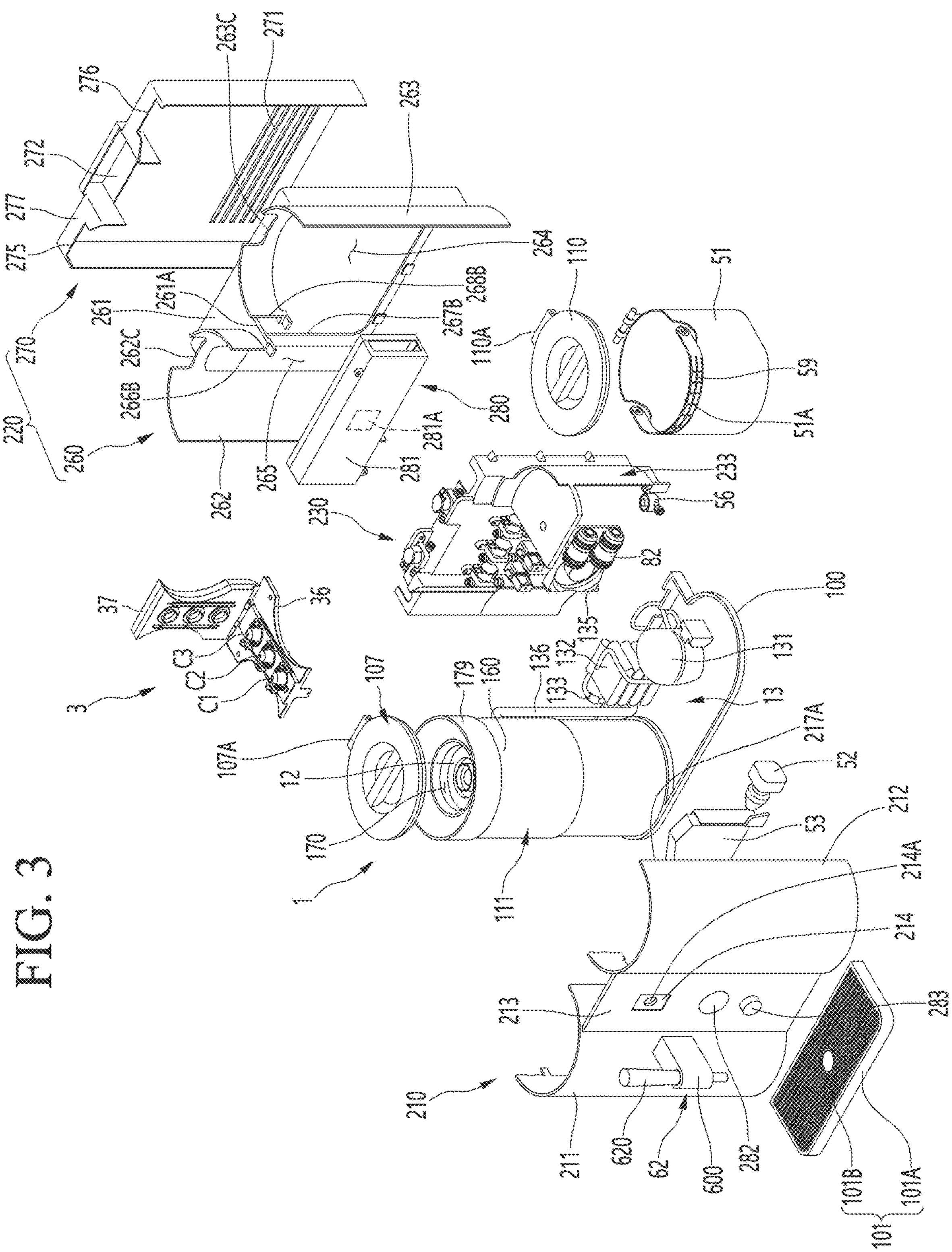
FIG. 3 is an exploded perspective view of the beverage maker shown in FIG. 2.

FIG. 2 is a perspective view of a beverage maker, and FIG. 3 is an exploded perspective view of the beverage maker shown in FIG. 2.

The beverage maker can include a base 100. The base 100 can define the appearance of the bottom of the beverage maker, and support a fermentation module 1, the refrigerant cycle device 13, a water supply heater 53, a water supply pump 52 and a main frame 230 located thereabove.

The beverage maker can further include a beverage container 101 capable of receiving and storing the beverage dropped from the dispenser 62. The beverage container 101 can be formed integrally with the base 100 or can be coupled to the base 100.

The beverage container 101 can include a container body 101A having formed therein a space in which the beverage dropped from the dispenser 62 is accommodated. The beverage container 101 can include a container upper plate 101*b* disposed on an upper surface of the container body 101A to cover the space in the container body 101A.

The container body 101A can be formed to protrude forward from the front portion of the base 100. The container body 101A can have an opened upper surface.

In the container upper plate 101B, a plurality of holes, through which the beverage is dropped into the container body 101A.

The beverage dropped around a beverage container of the beverage dropped from the dispenser 62 can be dropped into the container upper plate 101B, and can be temporarily stored in the beverage container 101 through the holes of the container upper plate 101B, thereby keeping the vicinity of the beverage maker clean.

The fermentation module 1 can be formed in an approximately cylindrical shape. The fermentation module 1 can be supported from the bottom by the base 100.

The fermentation module 1 can be disposed on the base 100. In this case, the fermentation module 1 can be directly seated on the base 100, or can be disposed on the base 100 and supported by a separate fermentation module supporter seated on the base 100.

The fermentation module 1 can include a fermentation tank module 111 having an opening 170 formed therein and a fermentation lid 107 covering the opening 170. As described above, the fermentation container 12 can be accommodated in the fermentation tank module 111.

The fermentation tank 112 can be accommodated in the fermentation case 160. Insulation can be located between the fermentation tank 112 and the fermentation case 160 to insulate the fermentation tank 112. In this case, the evaporator 134 (see FIG. 1) and the heater 14 (see FIG. 1) can be located between the insulation and the fermentation tank 112. That is, the insulation can surround the evaporator 134 and/or the heater 14 along with the fermentation tank 112, thereby easily controlling the temperature of the fermentation tank 112.

The fermentation lid 107 can be disposed on the fermentation tank module 111 and open and close the opening 170 of the fermentation tank module 111 from above.

The fermentation tank module 111 can further include a lid seating body 179 on which the fermentation lid 107 is seated. The lid seating body 179 can be disposed on the fermentation case 160 to support the fermentation lid 107 from the bottom.

The fermentation case 160 can define the appearance of a portion of the lower side of the fermentation module 1, and the fermentation lid 107 can define the appearance of a portion of the upper side of the fermentation module 1.

The fermentation case 160 can be placed on the base 100.

The fermentation lid 107 can be detachably, slidably or rotatably connected to the fermentation tank module 111. For example, the fermentation lid 107 can be hinge-connected to the fermentation tank module 111.

The fermentation lid 107 can be provided with a first hinge connector 107A protruding rearward, and the first hinge connector 107A can be hinge-connected to the fermentation tank module 111.

The refrigerant cycle device 13 can include a compressor 131, a condenser 132, an expansion mechanism 133 and an evaporator 134 (see FIG. 1). The beverage maker can further include a blower 135 for cooling the condenser 132.

The refrigerant cycle device 13 can be composed of a heat pump. The refrigerant cycle device 13 can include a refrigerant channel switching valve. The refrigerant channel switching valve can be composed of a four-way value. The refrigerant channel switching valve can be connected to a suction channel of the compressor 131 and a discharge channel of the compressor 131, can be connected to the condenser 132 through a condenser connecting channel, and can be connected to the evaporator 134 through an evaporator connecting channel.

The refrigerant channel switching valve can guide the refrigerant compressed by the compressor 131 to the condenser 132 and guide the refrigerant flowing from the evaporator 134 to the compressor 131, upon cooling the fermentation tank 112.

The refrigerant channel switching valve can guide the refrigerant compressed by the compressor 131 to the evaporator 134 and guide the refrigerant flowing from the condenser 132 to the compressor 131, upon heating the fermentation tank 112.

The base 100 can support at least a portion of the refrigerant cycle device 13. For example, the compressor 131 and the condenser 132 of the refrigerant cycle device 13 can be supported by the base 100.

In addition, the fermentation module 1 can be connected with a pipe 136. A part of a refrigerant pipe configuring the refrigerant cycle device 13 (see FIG. 1) can be built in the pipe 136. More specifically, a refrigerant pipe connecting the expansion mechanism 133 and the evaporator 134 (see FIG. 1) can be built in the pipe 136.

The water tank 51 can be disposed above the base 100 and can be spaced apart from the base 100. The water tank 51 can be spaced apart from the base 100 in a vertical direction by a water tank supporter 233 which will be described later.

The water tank 51 can be spaced apart from the fermentation module 1 in a horizontal direction. More specifically, the water tank 51 and the fermentation module 1 can be spaced apart from each other in a left-and-right direction.

The upper surface of the water tank 51 can be opened. The front and rear surfaces of the water tank 51 can be curved surfaces rounded in a horizontal direction, and both sides of the water tank 51 can be flat surfaces. In this case, the curvature of the front and rear surfaces of the water tank 51 can be equal to that of the outer circumferential surface of the fermentation module 1.

However, the present disclosure is not limited thereto and the shape of the water tank 51 can be changed as necessary. For example, the water tank 51 can be formed in a hollow cylindrical shape and with an opened upper surface.

The water tank 51 can be provided with a water tank handle 59. The water tank handle 59 can be rotatably connected to the water tank 51. More specifically, both ends of the water tank handle 59 can be hinge-connected to both sides of the water tank 51.

A user can lift the water tank 51 by holding the water tank handle 59 in a state of rotating the water tank handle 59 upward.

A stepped portion 51*a* can be formed on the upper end of the water tank 51. By forming a portion of the upper end of the water tank 51 to be stepped, the stepped portion 51*a* can be a portion with a lower height than the remaining upper portion. The stepped portion 51*a* can be formed by forming a portion of the front side of the upper end of the water tank 51 to be stepped.

The water tank handle 59 can be provided to be in contact with the stepped portion 51*a*. In this case, the width of the water tank handle 59 can be equal to the height of the step of the stepped portion. In addition, the water tank handle 59 can include a bent portion and the curvature of the bent portion can be equal to that of the front surface of the water tank 51.

The beverage maker can further include a water tank lid 110 covering the opened upper surface of the water tank 51. The water tank lid 110 can open and close the internal space of the water tank 51.

The water tank lid 110 can be rotatably connected to the water tank 51.

The water tank lid 110 can be provided with a second hinge connector 110A protruding rearward, and the second hinge connector 110A can be hinge-connected with the water tank 51.

The water tank lid 110 can be formed in the same or similar shape as the fermentation lid 107. This can allow the beverage maker to have a sense of unity in design and allow the same part to be used as the water tank lid 110 and the fermentation lid 107.

A height from the base 100 to the fermentation lid 107 can be equal to a height from the base 100 to the water tank lid 110. More specifically, a height between the base 100 and the upper surface of the fermentation lid 107 can be equal to a height between the base 100 and the upper surface of the water tank lid 110.

In some implementations, the beverage maker can further include an outer case 200.

The outer case 200 can be placed on the base 100.

The outer case 200 can define the appearance of the beverage maker.

The outer case 200 can include a fermentation module cover 201 covering the fermentation module 1 and a water tank cover 202 covering the water tank 51. The fermentation module cover 201 and the water tank cover 202 can be formed in a hollow cylindrical shape. A portion of the circumferential surface of the fermentation module cover 201 and the water tank cover 202 can be open.

The fermentation module cover 201 and the water tank cover 202 can surround at least a portion of the outer circumferences of the fermentation module 1 and the water tank 51, respectively. The fermentation module cover 201 and the water tank cover 202 can respectively fix and protect the fermentation module 1 and the water tank 51 from external impact.

The fermentation module cover 201 and the water tank cover 202 can be disposed to be spaced apart from each other in a horizontal direction.

The heights and/or diameters of the fermentation module cover 201 and the water tank cover 202 can be equal to each other. Therefore, the design of the appearance of the beverage maker can be improved by a symmetrical structure and unity.

The outer case 200 can be constructed by coupling a plurality of members. The outer case 200 can include a front cover 210 and a rear cover 220.

The front cover 210 can be disposed at the front side of the fermentation module 1, the water tank 51 and the main frame 230, and the rear cover 220 can be disposed at the rear side of the fermentation module 1, the water tank 51 and the main frame 230.

The front cover 210 can define the appearance of the front side of the beverage maker.

The dispenser 62 can be on the front cover 210. The dispenser 62 can be disposed closer to the upper end than the lower end of the front cover 210. The dispenser 62 can be located above the beverage container 101. The user can open the dispenser 62 to take out the beverage.

The front cover 210 can be constructed by coupling a plurality of members.

The front cover 210 can include a front fermentation module cover 211, a front water tank cover 212 and a center cover 213.

The front fermentation module cover 211 can cover a portion of the front side of the outer circumference of the fermentation module 1. The front fermentation module cover 211 can be a portion of the front side of the fermentation module cover 201.

The front fermentation module cover 211 can configure the fermentation module cover 201 along with the rear fermentation module cover 262 of the rear cover 220. That is, the fermentation module cover 201 can include the front fermentation module cover 211 and the rear fermentation module cover 262. The front fermentation module cover 211 and the rear fermentation module cover 262 can be fastened to each other.

The rear fermentation module cover 262 can cover a portion of the rear side of the fermentation module 1. The rear fermentation module cover 262 can be a portion of the rear side of the fermentation module cover 201. The rear fermentation module cover 262 can be located behind the front fermentation module cover 211.

In some implementations, the front water tank cover 212 can cover the front surface of the water tank 51. The front water tank cover 212 can be a portion of the front side of the water tank cover 202.

The front water tank cover 212 can configure the water tank cover 202 along with the rear water tank cover 263 of the rear cover 220. That is, the water tank cover 202 can include the front water tank cover 212 and the rear water tank cover 263. The front water tank cover 212 and the rear water tank cover 263 can be fastened to each other.

The rear water tank cover 263 can cover a portion of the rear side of the outer circumference of the water tank 51. The rear water tank cover 263 can be disposed behind the front water tank cover 212.

In some implementations, the center cover 213 can be disposed between the front fermentation module cover 211 and the front water tank cover 212. Both sides of the center cover 213 can be in contact with the front fermentation module cover 211 and the front water tank cover 212, respectively.

The center cover 213 can have a flat plate shape disposed vertically.

The height of the center cover 213 can be equal to those of the front fermentation module cover 211 and the front water tank cover 212.

In the center cover 213, a dispensing valve mounting portion 214 in which the dispenser 62 is mounted can be formed. In the dispensing valve mounting portion 214, the dispenser body 600 of the dispenser 62 can be mounted. The dispensing valve mounting portion 214 can be formed closer to the upper end than the lower end of the center cover 213.

A through-hole 214A opened in a front-and-rear direction can be formed in the dispensing valve mounting portion 214. The beverage dispensing channel 61 or the dispenser channel can pass through the through-hole 214A to be connected to each other.

The beverage maker can include a display 282 for displaying a variety of information of the beverage maker. The display 282 can be disposed on the center cover 213.

In some implementations, the display 282 can be provided at the center cover 213 at a position not to be covered by the dispenser 62. That is, the display 282 may not overlap the dispenser 62 in the horizontal direction.

The display 282 can include a display device such as a liquid crystal display (LCD), a light-emitting diode (LED) or an organic LED (OLED). The display 282 can include a display PCB on which a display device is mounted. The display PCB can be mounted on the rear surface of the center cover 213, and can be electrically connected to a controller 281A which will be described later.

The beverage maker can include an input unit for receiving a command related to making of the beverage maker.

The input unit can include at least one of a touchscreen for receiving a command of a user using a touch method, a rotary knob which is held and rotated by the user or a button pressed by the user.

For example, the input unit can include a rotary knob 283. The rotary knob 283 can be disposed on the center cover 213. The rotary knob 283 can be disposed below the display 282.

The rotary knob 283 can function as a button pressed by the user. That is, the user can hold or rotate the rotary knob 283 or press the front surface of the rotary knob 283, thereby inputting a control command.

In addition, the input unit can include a touchscreen for receiving the command of the user using a touch method. The touchscreen can be provided on the display 282 and the display 282 can function as a touchscreen.

The input unit can be electrically connected with the controller 281A which will be described later.

In addition, the beverage maker can further include a wireless communication module. The type of the wireless communication module is not limited and, for example, the wireless communication module can include a Bluetooth module and a Wi-Fi module.

The wireless communication module can be disposed on the rear surface of the center cover 213.

The wireless communication module can be electrically connected with the controller 281A which will be described later. By the wireless communication module, the beverage maker can perform wireless communication with a separate mobile terminal. The user can input a command, inquire making information or monitor a making process in real time using the mobile terminal.

In some implementations, the rear cover 220 can be coupled with the front cover 210, and an internal space of the outer case 200 can be formed between the rear cover 220 and the front cover 210.

The rear cover 220 can include a first rear cover 260 and a second rear cover 270.

The first rear cover 260 can be placed on the base 100, and the second rear cover 270 can be mounted behind the first rear cover 260.

An opening 264 opened in the front-and-rear direction can be formed in the first rear cover 260. More specifically, an opening 264 opened in the front-and-rear direction can be formed in a cover body 261. The opening 264 can be formed to face the main frame 230, which will be described later, in the front-and-rear direction. Therefore, the user can approach the inside of the beverage maker without removing the first rear cover 260.

The first rear cover 260 can include the cover body 261, the rear fermentation module cover 262 and the rear water tank cover 263. As described above, the rear fermentation module cover 262 can configure the fermentation module cover 201 along with the front fermentation module cover 211, and the rear water tank cover 263 can configure the water tank cover 202 along with the front water tank cover 212.

The rear fermentation module cover 262 and the rear water tank cover 263 can be mounted in the cover body 261. The rear fermentation module cover 262 and the rear water tank cover 263 can be mounted at the front side of the cover body 261.

A portion of the upper surface of the cover body 261 can be located between the rear fermentation module cover 262 and the rear water tank cover 263.

Avoidance grooves 262C and 263C can be formed in the upper ends of the rear fermentation module cover 262 and the rear water tank cover 263. A first avoidance groove 262C formed in the rear fermentation module cover 262 can correspond to a first hinge connector 107A formed on the lid body 109 of the fermentation lid 107, and a second avoidance groove 263C formed in the rear water tank cover 263 can correspond to the second hinge connector 110A formed on the water tank lid 110.

The avoidance grooves 262C and 263C can avoid interference with the hinge connectors 107A and 110A.

A through-hole 265 can be formed in the rear fermentation module cover 262. The through-hole 265 can be formed long in an upper-and-lower direction and can be opened in the front-and-rear direction. By the through-hole 265, channels connected with the fermentation module 1 may not interfere with the rear fermentation module cover 262.

The cover body 261 can support the ingredient supplier 3. At least a portion of the ingredient supplier 3 can be placed on the upper surface of the cover body 261, and the cover body 261 can support the ingredient supplier 3 from below.

A connecting channel avoidance groove 261A for avoiding interference with the connecting channels 311 and 312 (see FIG. 1) of the ingredient supplier 3 can be formed in the cover body 261.

In some implementations, the second rear cover 270 can be mounted behind the first rear cover 260. The second rear cover 270 can cover the opening 264 formed in the first rear cover 260.

The second rear cover 270 can be mounted in the cover body 261 of the first rear cover 260. The second rear cover 270 can be mounted to surround both sides of the first rear cover 260.

The second rear cover 270 can be configured such that the upper end thereof has the same height as the upper ends of the rear fermentation module cover 262 and the rear water tank cover 263.

At least one through-hole 271 can be formed in the rear cover 220, and more specifically, the second rear cover 270. The through-hole 271 can face the opening 264 and/or the through-hole 265 formed in the first rear cover 260 in the front-and-rear direction.

Gas discharged from the gas discharge valve 73 (see FIG. 1) or the pressure release valve 76 (see FIG. 1) can be discharged to the outside of the beverage maker through the through-hole 271. In addition, air exhausted from the exhaust valve 156 (see FIG. 1) can be discharged to the outside of the beverage maker through the through-hole 271.

The blower 135 can be disposed at the front side of the condenser 132. More specifically, the blower 135 can be disposed at a position overlapping the opening 264 and the through-hole 271 in the front-and-rear direction, and the condenser 132 can be located between the blower 135 and the through-hole 271. Air heat-exchanged in the condenser 132 by the blower 135 can be discharged to the outside of the outer case 200 by sequentially passing through the opening 264 and the through-hole 271.

An ingredient supplier accommodator 272 can be formed in the second rear cover 270.

The ingredient supplier accommodator 272 can be formed in the upper end of the second rear cover. A portion of the rear side of the ingredient supplier 3 can be accommodated in the ingredient supplier accommodator 272.

In addition, a third avoidance groove 275 and a fourth avoidance groove 276 can be formed in the second rear cover 270. The third avoidance groove 275 can correspond to the first avoidance groove 262C formed in the rear fermentation module cover 262, and the fourth avoidance groove 276 can correspond to the second avoidance groove 263C formed in the rear water tank cover 263.

In some implementations, the ingredient supplier 3 can be disposed between the fermentation module 1 and the water tank 51. Therefore, the beverage maker can be manufactured more compactly as compared to the case where the ingredient supplier 3 is located at a position other than the space between the fermentation module 1 and the water tank 51, and the ingredient supplier 3 can be protected by the fermentation module 1 and the water tank 51.

At least a portion of both side surfaces of the ingredient supplier 3 can be a curved surface, and the curved surface can be in contact with the outer circumference of the fermentation module cover 201 and the outer circumference of the water tank cover 202.

The ingredient supplier 3 can be spaced apart from the base 100 at the upper side of the base 100 in the upper-and-lower direction. In addition, the ingredient supplier 3 can be located above the main frame 230.

The ingredient supplier 3 can be located between the front cover 210 and the rear cover 220 in the front-and-rear direction. The front surface of the ingredient supplier 3 can be covered by the center cover 213 of the front cover 210, and the rear surface thereof can be covered by the ingredient supplier accommodator 272 of the second rear cover 270.

The ingredient supplier 3 can be supported by the cover body 261 of the first rear cover 260 and the ingredient supplier accommodator 272 of the second rear cover 270.

The ingredient supplier 3 can include a capsule mounting body 36 having formed therein capsule mounting portions 31, 32 and 33 in which capsules C1, C2 and C3 are detachably mounted, and a lid module 37 covering the capsule mounting portions 31, 32 and 33.

The capsule mounting body 36 can be supported by the cover body 261 of the first rear cover 260 and an ingredient supplier supporting portion 273 of the second rear cover 270.

The lid module 37 can be slidably disposed on or rotatably connected to the capsule mounting body 36. The lid module 37 can be hinge-connected to the capsule mounting body 36.

The ingredient supplier 3 can be installed to be approximately located on the central upper portion of the beverage maker, and the user can rotate the lid module 37 of the ingredient supplier 3 upward, thereby easily mounting and detaching the capsules C1, C2 and C3.

In some implementations, the beverage maker can include the main frame 230. At least some of the above-described valves and channels can be fixed to the main frame 230.

The main frame 230 can be located between the front cover 210 and the rear cover 220 in the front-and-rear direction. The main frame 230 can be disposed to be in contact with the outer circumference of the fermentation module 1.

The main frame 230 can be placed on the base 100. The main frame 230 can include a water tank supporter 233, and the water tank supporter 233 can separate the water tank 51 from the base 100 in the upper-and-lower direction.

At least a portion of the main frame 230 can be located below the ingredient supplier 3.

In the main frame 230, at least one of the water supply pump 52, the water supply heater 53, the blower 135 or the air pump 82 can be mounted. For example, the blower 135 and the air pump 82 can be mounted on the main frame 230, the water supply pump 52 and the water supply heater 53 can be mounted on the base 100.

The main frame 230 can partition the condenser 132 and the fermentation module 1, thereby preventing the temperature of the fermentation module 1 from increasing by heat of the condenser 132.

In some implementations, the compressor 131 can be disposed between the base 100 and the water tank 51 in the upper-and-lower direction.

In addition, the water supply heater 53 and the water supply pump 52 can be disposed at the front side of the main frame 230. The condenser 132 can be disposed at the rear side of the blower 135 mounted in the main frame 230.

The condenser 132 can be disposed to face the blower 135 mounted on the main frame 230. The condenser 132 can be disposed at the rear side of the blower 135.

In some implementations, the beverage maker can include a control module 280 for controlling the beverage maker.

The control module 280 can be an electrical part of the beverage maker. The control module 280 can be detachably mounted on the main frame 230.

The control module 280 can be disposed on the main frame 230. The control module 280 can be fastened to the rear surface of the main frame 230.

A PCB case 281 can be fastened to the main frame 230, thereby safely protecting a main PCB therein.

At least a portion of the control module 280 can be disposed to face the opening 264 formed in the first rear cover 260.

The control module 280 can include a main PCB and the PCB case 281 in which the main PCB is built. The main PCB can include a controller 281A for substantially controlling operation of the components of the beverage maker.

The controller 281A included in the control module 280 can be electrically connected with a wireless communication module. For example, the controller 281A can receive a command received through the wireless communication module, thereby making beverage. In addition, the controller 281A can transmit information on the beverage maker or made beverage from the wireless communication module to a separate mobile terminal.

In addition, the controller 281A can receive a command received through the input unit. For example, the controller 281A can make the beverage according to the command input by the rotary knob 283. In addition, the controller 281A can perform control to output a variety of information of the beverage maker on the display 282. For example, the controller 281A can display information such as the amount of dispensed beverage, the residual amount of beverage or beverage dispensing completion through the display 282.

The controller 281A can control at least one of the water supply pump 52, the water supply heater 53, the air pump 82 or a temperature controller 11. In addition, the controller 281A can control at least one of a flow rate control valve 54, an ingredient supply valve 310, a main valve 40, a bypass valve 35, an air supply valve 159, an exhaust valve 156, a beverage dispensing valve 64, a sub valve 92, a gas discharge valve 73, or a pressure release valve 76.

The controller 281A can receive at least one of values measured by a flow meter 56, a thermistor 54A, a water supply temperature sensor 57, a temperature sensor 16 or a gas pressure sensor 72.

More specifically, the controller 281A can detect the internal pressure of the fermentation container 12 by the gas pressure sensor 72 and detect the temperature of the fermentation tank 112 by the temperature sensor 16. The control module 280 can determine a degree of fermentation of the beverage using the detected pressure or temperature.

In addition, the controller 281A can detect the temperature of water supplied from the water supply module 5 to the first main channel 41 by the water supply temperature sensor 57, and control the water supply heater 53 according to the detected temperature of water.

In addition, the controller 281A can control the temperature controller 11, thereby maintaining the temperature of the fermentation tank 112 at an appropriate temperature.

In addition, the controller 281A can add at least one of a time when the dispenser 62 is opened, a time when the air pump 82 is driven or a time when the main valve 40 is turned on after the beverage is completely made. The controller 281A can calculate the amount of beverage dispensed from the fermentation container 12 according to the added time. The controller 281A can calculate the residual amount of beverage from the calculated amount of dispensed beverage. The controller 281A can determine whether the entire beverage in the fermentation container 12 has been dispensed, from the calculated residual amount of beverage. Upon determining that the entire beverage in the fermentation container 12 has been dispensed, the controller 281A can determine that beverage is completely dispensed.

In addition, the controller 281A can control overall operation of the beverage maker. This will be described in detail below.

Figure 4:
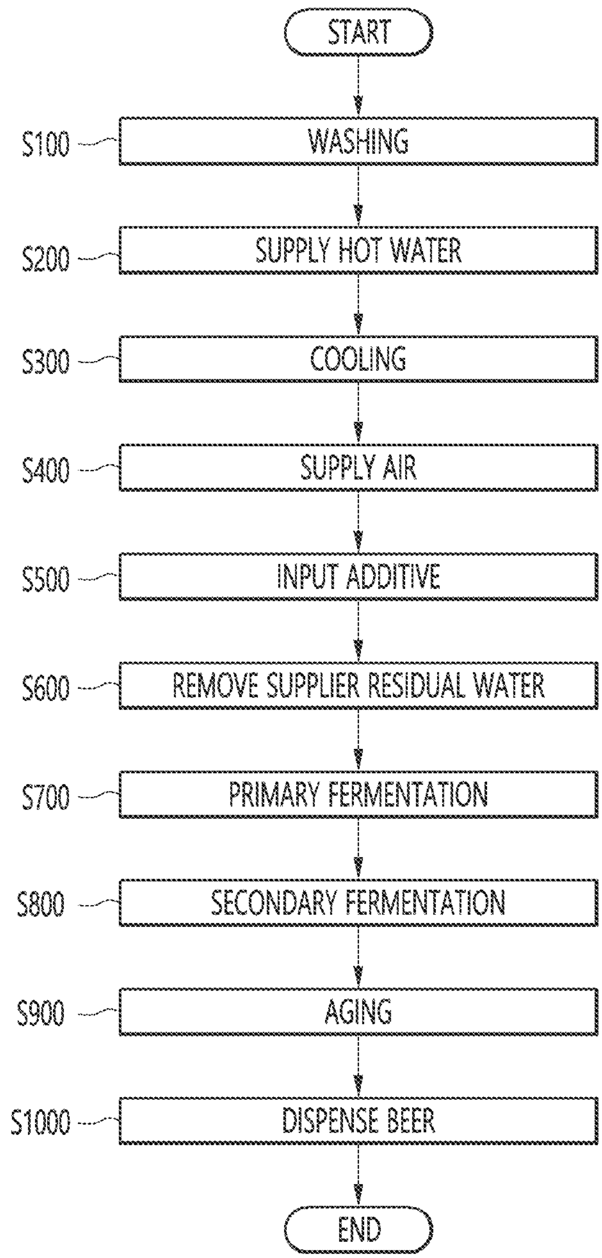
FIG. 4 is a flowchart illustrating a control sequence of one example of a simple mode.

FIG. 4 is a flowchart illustrating a control sequence of one example of a simple mode.

A beverage maker can operate in a simple mode.

The simple mode can be a general mode in which the beverage maker makes a beverage, and the simple mode can be a mode in which a beverage is made according to an algorithm pre-stored in the beverage maker 300 for each recipe of the beverage.

The simple mode is a mode in which a process/operation of transferring the beverage to a separate container is unnecessary. In the simple mode, a user can extract the beverage from the beverage maker to drink the beverage immediately.

In the simple mode, as illustrated in FIG. 4, the beverage maker can sequentially perform a cleaning process (S100), a water supply process (S200), a fermentation tank cooling process (S300), an air supply process (S400), an additive input process (S500), an ingredient supplier residual water removal process (S600), fermentation processes (S700 and S800), an aging process (S900), and a beverage dispensing process (S1000).

The cleaning process (S100) can be performed separately with respect from the beverage making process. The cleaning process (S100) can be performed before or after the beverage making process. The cleaning process (S100) can be performed after the beverage dispensing process (S1000).

The cleaning process (S100) can also be performed by a user input during the beverage making process. For example, during the primary fermentation process (S700) or the secondary fermentation process (S800), a main valve 40 can be closed, an ingredient supplier 3 may not contain an additive, and the cleaning process (S100) can be performed during the primary fermentation process (S700) or the secondary fermentation process (S800).

The user can input a cleaning command through the input unit provided in a control module 280, a remote controller, or a mobile terminal. A controller 281A can control the beverage maker to perform the cleaning processes (S100 and S1100) according to the input of the cleaning command.

Also, the user can input a beverage making command through the input unit provided in the control module 280, the remote controller, or the mobile terminal. The controller 281A can control the beverage maker to perform the cleaning process (S100) before and after the beverage making process according to the input of the beverage making process.

When the cleaning command is inputted through the input unit, the remote controller, or the mobile terminal, the controller 281A can open a beverage dispensing valve 64 and turns on a water supply pump 52 and a water supply heater 53. Also, the controller 281A can control the main valve 40 to be maintained in the closed state. In addition, the controller 281A can open an ingredient supply valve 310 and a bypass valve 35. In addition, the controller 281A can open a sub valve 92.

In the beverage maker, the cleaning can be performed during a cleaning set time. After the cleaning set time, the cleaning process can be completed.

When the cleaning set time elapses, the controller 281A can turn off the water supply pump 52 and the water supply heater 53 to close all of the beverage dispensing valve 64, the bypass valve 35, the ingredient supply valve 310, and the sub valve 92.

Then, the beverage maker 300 can include a beverage making process for making the beverage.

The beverage making process can be performed in a state in which a fermentation container 12 is accommodated in a fermentation tank 112, and capsules C1, C2, and C3 are accommodated in the ingredient supplier 3.

For the beverage making process, the user can open a fermentation lid 107 and insert the fermentation container 12 into the opening 170 to seat the fermentation container 12 on the fermentation module 1.

Thereafter, the user can close the fermentation lid 107, and the inside of the fermentation tank 112 can be closed by the fermentation lid 107.

The user can insert the plurality of capsules C1, C2, and C3 into the ingredient supplier 3 before the fermentation container 12 is seated to cover a plurality of capsule mounting portions 31, 32, and 33 by using a lid module 37.

The user can input the beverage making command through the input unit, the remote controller, or the mobile terminal connected to the controller 281A. The controller 281A can control the beverage maker to perform the beverage making process according to the input of the beverage making command.

The beverage making process can include a water supply process (S200).

In the water supply process (S200), the controller 281A can turn on the water supply pump 52 and the water supply heater 53 and close the ingredient supply valve 310. In the water supply process (S200), the controller 281A can turn off the bypass valve 35 and the main valve 40. In addition, when water is supplied to the fermentation container 12, the controller 281A can turn off an exhaust valve 156.

During the water supply process (S200), a flow meter 56 can detect a water quantity.

The controller 281A can perform the water supply process (S200) until an amount of accumulated water detected by the flow meter 56 reaches a set flow rate, and when an amount of accumulated water detected by the flow meter 56 reaches the set flow rate, the water supply process (S200) can be completed.

When the water supply process (S200) is completed, the controller 281A can turn off the water supply pump 52 and the water supply heater 53 and close the bypass valve 35. When the water supply process (S200) is completed, the controller 281A can close the gas discharge valve 73 and the exhaust valve 156.

The beverage making process can include a fermentation tank cooling process (S300).

The fermentation tank cooling process (S300) can be performed when the water supply process (S200) is completed.

The controller 281A can control the compressor so that the temperature detected by the temperature sensor 16 is maintained at the set temperature (for example, about 35° C.). In more detail, when the temperature detected by the temperature sensor 16 exceeds a compressor turn-on temperature (for example, about 35.5° C.), the controller 281A can turn on the compressor of the refrigerant cycle device 13. When the temperature detected by the temperature sensor 16 is less than a compressor turn-off temperature (for example, about 34.5° C.), the control module 280 can turn off the compressor.

When a temperature of the fermentation container 12 is less than a set temperature in a state in which the refrigerant cycle device 13 is turned off because an external temperature is extremely low. In this case, the controller 281A can turn on the heater 14 disposed in a lower portion of the fermentation tank 112. The controller 281A can turn of the heater 14 when the temperature detected by the temperature sensor 16 is less than a heat turn-on temperature. When the temperature detected by the temperature sensor 16 is less than a heater turn-off temperature, the controller 281A can be turned off the heater.

The beverage making process can include an air supply process (S400).

The air supply process (S400) is a process of mixing liquid malt by supplying air into the fermentation container 12.

The air supply process (S400) can start when the temperature detected by the temperature sensor 16 is less than or equal to a compressor off temperature at least once after the fermentation tank cooling process (S300) starts, and a compressor of the refrigeration cycle device 13 is turned on.

The air supply process (S400) can start when the temperature detected by the temperature sensor 16 is equal to or greater than the heater turn-off temperature at least once when the fermenter cooling process (S300) starts, and the heater 14 is turned on.

In the air supply process (S400), the controller 281A can turn on the air pump 82 and turn off the bypass valve 35 and the main valve 40. Also, the controller 281A can turn off the gas discharge valve 73 and the exhaust valve 156 and maintain the closed state of the air supply valve 159 and the ingredient supply valve 310.

While the air pump 82 is turned on, air injected into the air injection channel 81 can flow from the first main channel 41 to the second main channel through the bypass channel 43 and then be introduced into the fermentation container 12 by passing through the main valve 40. As described above, the air introduced into the fermentation container 12 can collide with liquid malt to assist the uniform mixing of the heated water and the liquid malt, and the air colliding with the liquid malt can supply oxygen into the liquid malt. That is, the agitation and aeration can be performed.

While the air pump 82 is turned on, the air is mixed with the liquid malt during a mixing set time, the air pump 82 is turned on, and the mixing set time elapses, the air supply process (S400) can be completed. When the air supply process (S400) is completed, the controller 281A can turn off the air pump 82 and close the bypass valve 35. Also, when the air supply process (S400) is completed, the controller 281A can close the gas discharge valve 73 and the exhaust valve 156.

The beverage making process can include the additive input process (S500).

The additive input process (S500) can start after the air supply process (S400).

In the additive input process (S500), the controller 281A can turn on the water supply pump 52 and maintain the turn-off of the water supply heater 53. Also, the controller 281A can maintain the closing of the bypass valve 35 and open the ingredient supply valve 310 and the main valve 40. Also, the controller 281A can open the gas discharge valve 73 and the exhaust valve 156.

After the additive input process (S500) starts, when the accumulated flow rate detected by the flow meter 56 reaches an additive input set flow rate, the controller 281A can complete the additive input process (S500). When the additive input process (S500) is completed, the controller 281A can turn off the water supply pump 52.

The beverage making process can further include an ingredient supplier residual water removing process (S600).

The residual water removal process (S600) can be performed after the additive input process (S500) is completed.

In the ingredient supplier residual water removing process (S600), the controller can turn on the air pump 82 and maintain the closing of the air supply valve 159. Also, the controller 281A can open the ingredient supply valve 310 and the main valve 40. Also, the controller 281A can open the gas discharge valve 73 and the exhaust valve 156.

The controller 281A can turn on the air pump 82 during the residual water removing set time, and when the residual water removing set time elapses, the ingredient supplier residual water removing process (S600) can be completed.

When the ingredient supplier residual water removing process (S600) is completed, the controller 281A can turn off the air pump 82 and close the ingredient supply valve 310 and the main valve 40. Also, the controller 281A can close the gas discharge valve 73 and the exhaust valve 156.

When the ingredient supplier residual water removing process (S600) is completed, the controller 281A can display a capsule separation message for informing separation of the capsules C1, C2, and C3 on the display 282, and the user can remove the empty capsule from the ingredient supplier 3.

The beverage making process can include fermentation processes (S700 and S800).

In a simple mode, the fermentation processes (S700 and S800) can include a primary fermentation process (S700) and a secondary fermentation process (S800), and the primary fermentation process (S700) and the secondary fermentation process (S800) can be sequentially performed after the ingredient supplier residual water removal process (S600) is completed.

According to an example of the primary fermentation process (700), the primary fermentation process (S700) can include a pre-fermentation process and a main-fermentation process. The main-fermentation process can be performed after the pre-fermentation process is completed.

The pre-fermentation process can be a process of quickly and actively activating yeast added into the fermentation container 12 during the additive input process (S500).

In the pre-fermentation process, the controller 281A can control the refrigerant cycle device 13 and the heater 14 so that the temperature measured by the temperature sensor 16 is maintained at a pre-fermentation target temperature (for example, 30° C.). After the pre-fermentation process, the controller 281A can periodically open the gas discharge valve 73 and then close the gas discharge valve 73 to store a pressure value detected by the gas pressure sensor 72 in a storage unit just after the gas discharge valve 73 is closed. The controller 281A can calculate a variation in pressure by comparing the stored pressure value with the pressure value detected after a predetermined time elapses in the gas discharge valve 73 is closed. When the variation in calculated pressure exceeds a pre-fermentation set pressure, the controller 281A can determine that the pre-fermentation is completed, the pre-fermentation process can be completed.

When the pre-fermentation process is completed, the controller 281A can start the main-fermentation process.

In the main-fermentation process, the controller 281A can control the refrigerant cycle device 13 and the heater 14 so that the temperature measured by the temperature sensor 16 is maintained at a main-fermentation target temperature (for example, 21° C.). Here, the main-fermentation target temperature can be higher than the pre-fermentation target temperature.

After the main-fermentation process starts, the controller 280 can periodically open the gas discharge valve 73 and then close the gas discharge valve 73 to store a pressure value detected by the gas pressure sensor 72 in the storage unit while the gas discharge valve 73 is closed. When a variation in pressure that is periodically detected by the gas pressure sensor 72 exceeds the main-fermentation set pressure, the control module 280 can determine that the main-fermentation is completed, and the primary fermentation process (S700) can be completed.

However, the implementations may not be limited to the primary fermentation process (S700). For example, according to another example of the primary fermentation process (S700), the primary fermentation process (S700) may not include the pre-fermentation process but can include only the main-fermentation process. Since this is duplicated, this description will be omitted.

The controller 281A can start the secondary fermentation process (S800) after the primary fermentation process (S700).

When the secondary fermentation process (S800) is performed, the controller 281A can control the refrigerant cycle device 13 and the heater 14 so that the temperature measured by the temperature sensor 16 becomes a secondary fermentation target temperature.

In the secondary fermentation process (S800), since an inner pressure of the fermentation container 12 is high, if the gas discharge valve 73 is opened, large noise can occur. To solve this limitation, the controller 281A can maintain the closing of the gas discharge valve 73 during the secondary fermentation process (S800) and control opening/closing of the pressure release valve 78 provided with the noise reducing device 77.

After the secondary fermentation process (S800) starts, the controller 281A can periodically open the pressure release valve 76 and then close the pressure release valve 76 to store a pressure value detected by the gas pressure sensor 72 in the storage unit while the pressure release valve 76 is closed. When the variation in pressure that is periodically detected by the gas pressure sensor 72 exceeds a secondary fermentation set pressure, the controller 281A can determine that the secondary fermentation is completed, and the secondary fermentation process (S800) can be completed.

The beverage making process can include an aging process (S900).

The aging process (S900) can be performed when both the primary fermentation process (S700) and the secondary fermentation process (S800) are completed.

In the aging process, the controller 281A can standby for an aging time and control the refrigerant cycle device 13 and the heater 14 so that a temperature of the beverage is maintained between an upper limit value and a lower limit value of a set aging temperature during the aging time.

Since the beverage maker is mainly used in an indoor space, an external temperature of the beverage maker can be maintained between the upper limit value and the lower limit value of the set aging temperature or have a temperature higher than the upper limit value of the set aging temperature. In this case, when the temperature detected by the temperature sensor 16 is less than the lower limit value of the set aging temperature, the controller 281A can turn off the compressor of the refrigerant cycle device 13, and when the temperature detected by the temperature sensor 16 is greater than the upper limit value of the set aging temperature, the controller 281A can turn on the compressor.

Exceptionally, in the case in which the external temperature of the beverage maker is less than the lower limit value of the set aging temperature, the controller 281A can turn on the heater 14 when the temperature detected by the temperature sensor 16 is less than the lower limit value, and the controller 281A can turn off the heater 14 when the temperature detected by the temperature sensor 16 is greater than the upper limit value of the set aging temperature.

When the aging time elapses, the making of the beverage by using the beverage maker can be completed.

The controller 281A can display the completion of the making of the beverage through the display 282.

The beverage dispensing process (S1000) can be a process of dispensing the beverage of the beverage maker to the outside.

In the beverage dispensing process (S1000), the user can dispense the beverage by manipulating the dispenser 62.

After the beverage is completely made, when the user opens the dispenser 62, the controller 281A can open the main valve 40 and the beverage dispensing valve 64.

When the user closes the dispenser 62, the controller 281A can close the main valve 40 and the beverage dispensing valve 64, and the beverage dispensing process (S1000) can be completed.

When the beverage of the fermentation container is completely dispensed, the controller 281A can display a replacement notification on the display 282. The user can open the fermentation lid to remove the empty fermentation container 12 from the fermentation tank 112 and insert the separate cleaning pack into the fermentation tank 112. Thereafter, the fermentation lid 107 can be closed.

Figure 5:
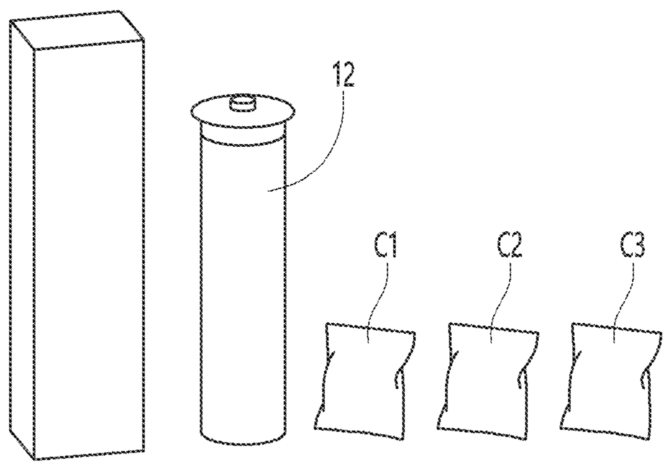
FIG. 5 is a view illustrating an example of a fermentation container and a capsule.

FIG. 5 is a view illustrating the fermentation container and the capsule.

A manufacturer and the like of beverage makers can sell wort, yeast, hop oil, flavor, etc. in a package form, and the fermentation container 12 containing the wort, the first capsule C1 containing the yeast, the second capsule C2 containing the hop oil, and the third capsule C3 containing the flavor can be sold as a capsule package.

The manufacturer and the like can sell the optimal capsule package for each type of beverages, components of the capsules can be sold individually, and the beverages can be freely selected by the manufacture of the beverage maker, and the fun of making a special drink (my own drink) that is not standardized for the user (customer) can be given.

The beverage maker can make IPA, pale ale, stout, wheat, pilsner, red ale, my ale, my lager, and the like.

Table 1 shows recipes for various beverages made by the beverage maker.

standardized capsule packages, and an algorithm that is capable of being selected during the brewing in the beer maker can be applied. The customer can optimize and apply any combination of the ingredients by this brewing algorithm to make beer.

That is, the beverage maker can make my-own ale beer by selecting the beer ingredients, and the my-own ale beer can be made by selecting malt, hops, and flavor. In addition, the user (customer) can enjoy beer (ale/lager) in a new style by various combinations of the wort and capsules.

Figure 6:
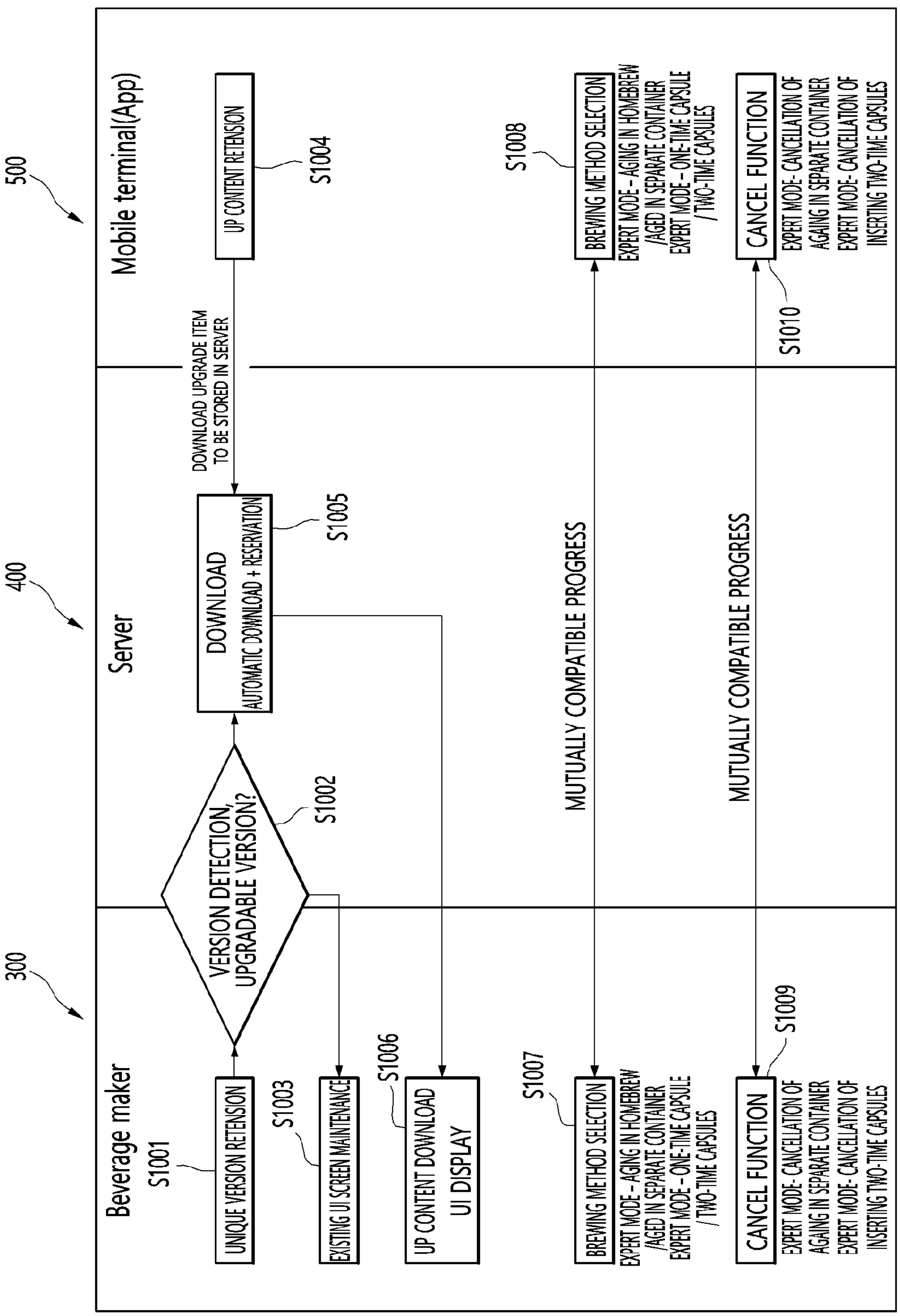
FIG. 6 is a view illustrating an example of an operating state of a system for making a beverage.
Figure 7:
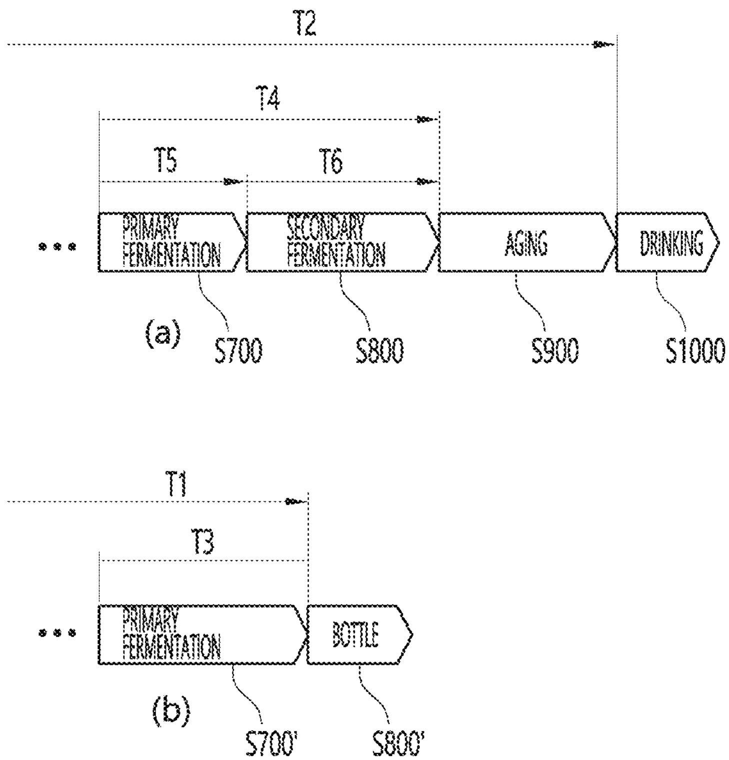
FIG. 7A is a view illustrating an example of a beverage making process in the simple mode.
FIG. 7B is a view illustrating an example of a beverage making process in an expert mode.

FIG. 6 is a view illustrating an operating state of a system for making the beverage. FIGS. 7A and 7B are views illustrating the making process in the simple mode and the making process in the expert mode, respectively.

The system for making the beverage can include the beverage maker 300 illustrated in FIGS. 1 to 3, a server 400, and a mobile terminal 500.

The system for making the beverage can include a user interface.

An example of the user interface can be a display 282 of the beverage maker 300, and in this case, the display 282 of the drink maker 300 can include a touch screen that receives a user's command in a touch manner.

Another example of the user interface can be a display of the mobile terminal 500, and in this case, the display of the mobile terminal 500 can include a touch screen that receives a user's command in a touch manner.

Hereinafter, for convenience, the user interface is described as being the display of the mobile terminal 500, but the user interface is not limited to the display of the mobile terminal 500. For example, the user interface can be a display 282 of the beverage maker 300.

TABLE 1

| Classification | IPA | Pale Ale | Stout | Wheat | Pilsner | Red Ale | My Ale | My Lager |
|---|---|---|---|---|---|---|---|---|
| Description of recipe | The citrus and tropical fruit hop flavors may be felt, and the taste of American-style beer with pleasant bitterness is pursued. | The taste of American-style beer that is not sweet and easily enjoyed by anyone due to the harmony of restrained American hop flavor and malt caramel is pursed. | The taste of Irish-style beer with a rich and dark color, in which the roast flavor of coffee and dark chocolate is felt in the mouth, and the lingering of a creamy aftertaste savors, is pursued. | The soft Belgian-style beer taste with a refreshing orange scent, a spicy coriander scent, and the complex taste of malt and wheat is pursued. | The taste of Czech-style beer in which is bitter but not irritating due to the harmony of the hop and malt and the deep taste through a long brewing time is pursued. | The taste of heavy and calm ale beer with the sweet scent of caramel and the savory taste of nuts is pursued. The richer taste and aroma may be enjoyed. | My own ale beer may be made by combining beer ingredients. | My own lager beer may be made by combining beer ingredients. The cleaner taste and aroma may be enjoyed. |
| Wort | Hopi | Deep gold | Dark | Wheat | Deep gold | Hopi | When the customers are freely combined, this brewing recipe algorithm is selected and brewed. Your own beer may be made by combining the desired wort and capsules. The wort and yeast capsules are necessary. | |
| Yeast oil | American ale | American ale | England ale | Weizen | Larger | English ale | | |
| Hop oil | Cascade, Chinook | Cascade, Fuggles | Fuggles, Goldings | | Hallertau, Citrus | Hallertau, Fuggles | | |
| Flavour | | | | Orange flavor, Coriander flavor | | | | |

IPA, pale ale, stout, wheat, pilsner, red ale, etc. can be made according to standardized recipes, and my ale, my lager, etc. can be made by non-standard recipes.

My ale and my lager can be special menus and be made as my own by freely combining beer ingredients (wort, yeast, hop oil, or flavor) by the customer in addition to the The simple mode (see FIG. 7A) and the expert mode (see FIG. 7B) can be selectively inputted to the user interface.

The user of the beverage maker 300 can input the simple mode or the expert mode through the user interface, and the user can select the beverage making process (simple mode or expert mode).

The expert mode can be a mode in which the beverage maker 300 makes a beverage through a process different from a general mode (a simple mode) and can be a special mode different from the general mode.

The expert mode can be a mode in which beer is made by adjusting fermentation conditions (adding capsules, aging method, fermentation temperature, acidity level: strong, aging period, etc.) to conditions desired by the user (customer).

The expert mode can be a mode in which the beverage maker 300 ferments the beverage to age the fermented beverage in a separate container.

In the expert mode, the beverage maker can sequentially perform a cleaning process (S100), a water supply process (S200), a fermentation tank cooling process (S300), an air supply process (S400), an additive input process (S500), an ingredient supplier residual water removal process (S600), a fermentation process (S700'), and a bottling process (S800').

The expert mode can be the same as the simple mode before the fermentation process (700'), and the fermentation process (S700') and the bottling process (S800') can be different from those in the normal mode (the simple mode).

The expert mode can be a mode in which the user directly selects/sets beverage making conditions (e.g., fermentation conditions) to make the beverage.

Before making the beverage through the beverage maker 300, the user can select the simple mode and the expert mode.

The user can select and input the expert mode between the simple mode and the expert mode, select a fermentation temperature, select a maturation period, select a secondary capsule input function, or select a storage method after the fermentation.

For example, one of temperatures of 12° C., 18° C., 21° C., and 25° C. can be selected/input as the fermentation temperature.

For example, any one of 2 days (recommended), 3 days, and 4 days can be selected/input as the aging period.

In the secondary capsule input function, whether the user secondarily inputs the capsule and whether the user does not secondarily input the capsule.

After the fermentation process, the beverage can be continuously stored by the beverage maker 300 or moved to a separate container and then stored, and whether the beverage maker 300 stores the beverage after the fermentation process and whether the beverage maker 300 stores the beverage in a separate container rather than the beverage maker 300 after the fermentation process can be selected as the storage method after the fermentation.

As described above, the user can select the fermentation temperature, the aging period, the secondary capsule input function, or the storage method after the fermentation, and the user can make a beverage that is different from that in the normal mode.

As described above, when the user completes the selection of the fermentation temperature, the aging period, the secondary capsule input function, and the storage method after the fermentation, the user can confirm that a recipe in the expert mode through the user interface, and thus, the user can confirm the selected setting.

A system for making the beer can increase in a degree of freedom in the user's bear making, can make beverages in the number of cases customer setting, and can increase in user's enjoyment of using the beverage maker 300.

The system for making the beverage can further include a controller.

An example of the controller can be the controller 281A of the beverage maker 300, the controller of the server 400, or the controller of the mobile terminal 500, or a combination of the controllers.

The controller can control the user interface, and the controller can selectively perform the simple mode and the expert mode according to the input of the user interface.

The expert mode can be a mode in which the making time of the beverage maker is less than that in the simple mode. That is, a time taken to make the beverage by the beverage maker in the expert mode can be less than that taken to make the beverage by the beverage maker in the simple mode.

The simple mode can be a mode in which the beverage is dispensed (S1000) after the fermentation process (S700 and S800) and the aging process (S900) are sequentially performed.

In the simple mode, as illustrated in FIG. 7A, the beverage maker 300 can perform the fermentation processes (S700 and S800) and the aging process (S900) according to the pre-stored algorithm. After the aging process (S900), the beverage can be dispensed (S1000) and drunk by manipulating the beverage dispenser 6.

The expert mode can be a mode in which the beverage is bottled (S800'; transferring the beverage to the separate container) after the fermentation process (S700') is performed.

In the expert mode, as illustrated in FIG. 7B, the beverage maker 300 can perform the fermentation process (S700'). After the fermentation process (S700') is completed, the user can bottle the beverage (S800'). In the expert mode, the user can place the separate container under the beverage dispenser 6, and the beverage on which the fermentation process (S700') has been completed can move to be stored in the separate container.

An example of the separate container can be a pressure-resistant container that is used exclusively for beer, and sugar for the fermentation can be put into the pressure-resistant container that is used exclusively for beer.

A beverage making time T1 of the beverage maker 300 in the expert mode (see FIG. 7B) can be less than a beverage making time T2 of the beverage maker 300 in the simple mode (see FIG. 7A).

A time T3 of the fermentation process (S700') in the expert mode can be less than a time T4 of each of the fermentation processes (S700 and S800) in the normal mode.

As illustrated in FIGS. 7A and 7B, the fermentation process in the simple mode can include the primary fermentation (S700) and the secondary fermentation (S800). The fermentation process in the expert mode includes the primary fermentation (S700').

The fermentation process in the expert mode can be completed after performing the primary fermentation 700', and may not perform the secondary fermentation after the primary fermentation 700'.

The time T3 of the primary fermentation 700' in the expert mode can be greater than a time T5 of the primary fermentation (S700) in the simple mode.

The time T3 of the primary fermentation 700' in the expert mode is less than a sum T5+T6 of the time T5 of the primary fermentation (S700) in the simple mode and the time T6 of the secondary fermentation (S800) in the simple mode.

The beverage maker 300, the server 400, and the mobile terminal 500 can communicate with each other, and the user can upgrade the beverage maker 300 through the mobile terminal 500.

The mobile terminal 500 can be a user terminal used by the user of the beverage maker 300.

When an upgrade item is transmitted through the mobile terminal 500, the server 400 can download the upgrade item, and the beverage maker 300 can download the upgrade item from the server 400 so as to be upgraded.

The beverage maker 300 is not limited to include the built-in function when selling the product, and can continuously add new functions.

The beverage maker 300 can have a unique version. (S1001)

The beverage maker 300 or the server 400 can detect the unique version of the beverage maker 300 and can determine whether the unique version is an upgradeable version. (S1002)

If the unique version is not the upgradeable version, the beverage maker 300 can continue to perform the existing function and maintain an existing user interface UI screen. (S1003)

The mobile terminal 500 can include a specific application capable of controlling and managing the beverage maker 300, and the user can input a content to upgrade the beverage maker 300 through the specific application. The mobile terminal 500 can have a content to be upgraded. (S1004)

The server 400 can download an upgrade item (content) from the mobile terminal 500 to store the upgrade item in the server. The server 400 can download automatically or by reservation. (S1005)

If the unique version of the beverage maker 300 is the upgradeable version, the server 400 can transmit the upgrade item (content) to the beverage maker 300, and the beverage maker 300 can download the upgrade item and can display the user interface. (S1006)

The beverage maker 300 and the mobile terminal 500 can be compatible with each other. When a brewing method is selected in the beverage maker 300, the beverage maker 300 can make the brewing method compatible with the mobile terminal 500, and when the brewing method is selected in the mobile terminal 500, the mobile terminal 500 can allow the brewing method to be compatible with the beverage maker 300. (S1007 and S1008)

Here, an example of the brewing method can include aging in a homebrew (beverage maker 300) in the expert mode or aging in the separate container and can include a process of inputting the capsule once or inputting the capsule twice.

When cancel of the brewing method is selected in the beverage maker 300, the beverage maker 300 can make the cancel of the brewing method compatible with the mobile terminal 500, and when the cancel of the brewing method is selected in the mobile terminal 500, the mobile terminal 500 can allow the cancel of the brewing method to compatible with the beverage maker 300. (S1009 and S1010)

Here, the cancel of the brewing method can include a process of minimizing the aging in the separate container in the expert mode and can include a process of canceling the input of capsules twice.

Hereinafter, referring to FIG. 8, a process for allowing the user to input the expert mode will be described.

Figure 8:
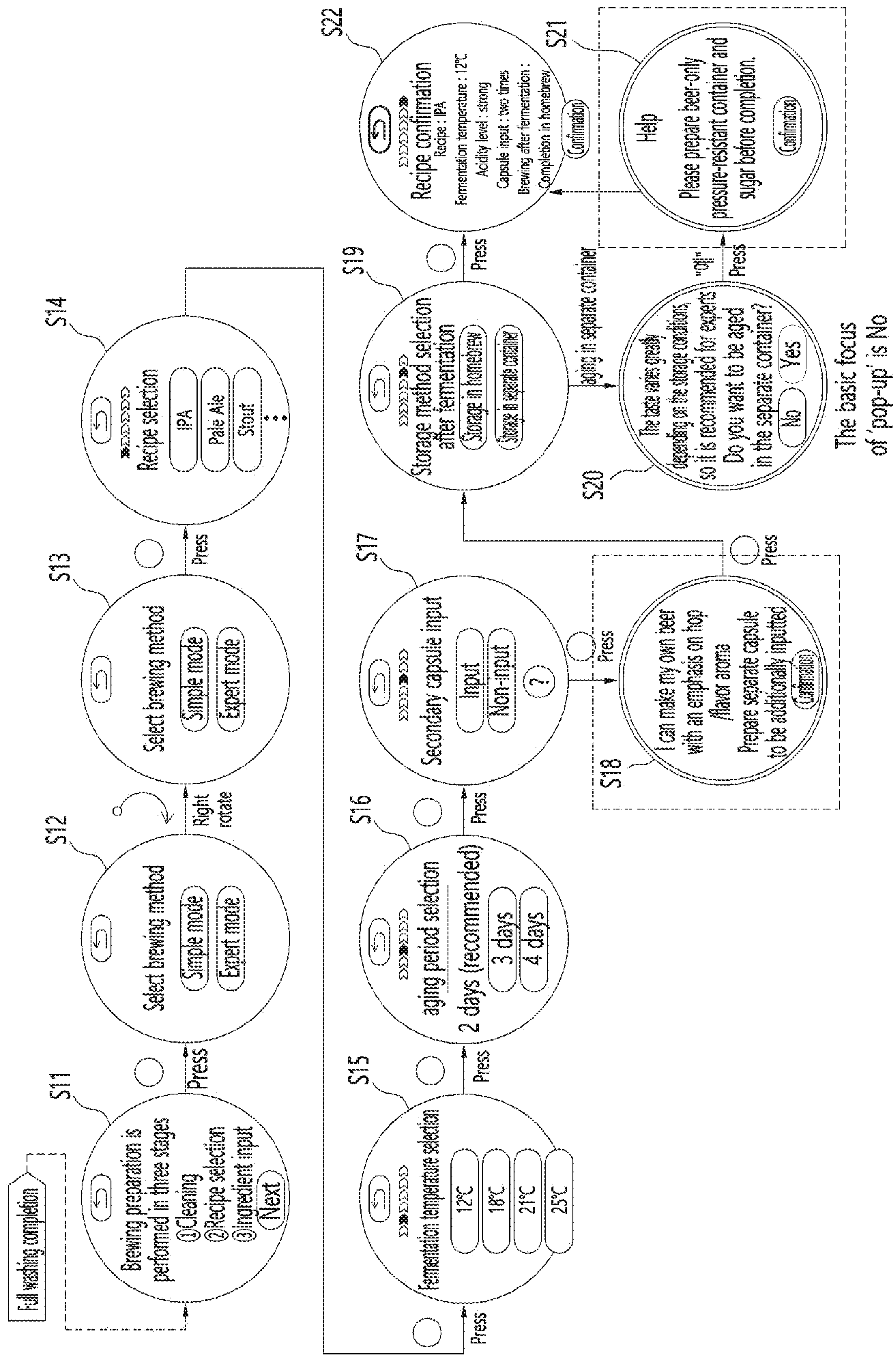
FIG. 8 is a view illustrating an example of a user interface into which the expert mode in the system for making the beverage is inputted.

FIG. 8 is a view illustrating the user interface into which the expert mode in the system for making the beverage is inputted.

The user interface can display mode selection screens S11, S12, and S13 in which the simple mode and the expert mode are selectively inputted.

When the washing (cleaning process (S100)) is completed, the display can display mode selection screens S11, S12, and S13 for selecting the simple mode and the expert mode.

The mode selection screens S11, S12, S13 can include a menu display screen S11 and brewing method selection screens S12 and S13.

When the washing (cleaning process (S100)) is completed, the display can display the menu display screen S11 displaying a washing menu, a recipe menu, a material input menu, and a next menu together. Here, the recipe menu can be displayed more clearly than a washing menu or an ingredient input menu or can be displayed in bold letters. (S11) Then, the next menu can be displayed with a blue border. (S11)

When the user inputs the next menu, the user interface can change the menu display screen S11 to the brewing method selection screen S12 and S13.

The input can be defined as user's clicking or pressing by touching the screen, and hereinafter, the input will be described with the same meaning.

When the user inputs the next menu, the user interface can display a basic screen S12. The basic screen S12 can display a guide phrase such as 'Select brewing method', a simple mode menu, and an expert mode menu together. The basic screen S12 can be a screen displaying the simple mode menu with a blue border.

When the user inputs the simple mode menu, the beverage maker can be controlled in the same sequence as illustrated in FIG. 4.

In some examples, if the user rotates his or her finger in a clockwise direction while touching the screen without inputting the simple mode menu, the user interface can display the expert mode screen S13. The expert mode screen S13 can display a guide phrase such as 'Select brewing method', a simple mode menu, and an expert mode menu together, but display the expert mode menu with a blue border.

When the user inputs the expert mode menu on the expert mode screen S13, the expert mode can be selected.

When the expert mode is selected, the user interface can display condition input screens S14, S15, S16, S17, S18, S19, S20, and S21 for inputting conditions of the expert mode.

The user can select various examples of the expert mode through the condition input screens S14, S15, S16, S17, S18, S19, S20, and S21. The beverage maker can make different kinds of beverages in the simple mode by various combinations of the condition input screens S14, S15, S16, S17, S18, S19, S20, and S21.

The condition input screens S14, S15, S16, S17, S18, S19, S20, and S21 can include a recipe selection screen (S14), a fermentation temperature selection screen (S15), an aging period selection screen (S16), secondary capsule input selection screens S17 and S18, and a storage method selection screen S19.

When the expert mode is selected through the expert mode screen S13, the user interface can display the recipe selection screen S14.

The recipe selection screen S14 can display a plurality of beverage types and display a plurality of beverage menus together. For example, the recipe selection screen S14 can display an IPA menu, a pale ale menu, and a stout menu together. In the recipe selection screen S14, a border of one menu can be displayed with a blue color, and a border of another menu may not be displayed with a blue color. The recipe selection screen S14 can display a phrase inducing selection of a recipe, such as "recipe selection".

When the user selects one of the plurality of beverage menus, the user interface can display the fermentation temperature selection screen S15. The fermentation temperature selection screen S15 can display a plurality of temperature menus together. For example, the fermentation temperature selection screen S15 can display 12 menus, 18 menus, 21 menus, and 25 menus together. In the recipe selection screen S14, a border of one temperature menu can be displayed with a blue color, and a border of another temperature menu may not be displayed with a blue color.

The fermentation temperature selection screen S15 can display a temperature menu differently according to the type of beverage selected on the recipe selection screen S14.

For example, if the ale menu is selected on the recipe selection screen S14, a 21° C. menu can be displayed differently from other menus so that the 21° C. menu is recommended, and a phrase such as "Recommended" is displayed next to the 21° C. menu can be displayed together. For example, if the lager menu is selected on the recipe selection screen S14, a 12° C. menu can be displayed differently from other menus so that the 12° C. menu is recommended, and a phrase such as "Recommended" is displayed next to the 12° C. menu can be displayed together.

The fermentation temperature selection screen S15 can display a phrase inducing selection of the fermentation temperature, such as "fermentation temperature selection".

When the user selects one of the plurality of temperature menus, the user interface can display the aging period selection screen S16.

The aging period selection screen S16 can display a plurality of aging periods and display a plurality of aging period menus together. For example, the aging period selection screen S16 can display a 2-day menu, a 3-day menu, and a 4-day menu together. In the aging period selection screen S16, a border of one aging period menu can be displayed differently from a border of the other aging period menus. In the aging period selection screen S16, a phrase such as "Recommended" can be displayed next to any one aging period menu.

The aging period selection screen S16 can display a phrase inducing selection of an aging period, such as "Select maturing period".

When the user selects one of the plurality of maturation period menus, the user interface can display the second capsule input selection screens S17 and S18.

The second capsule input selection screens S17 and S18 can display phrases related to additional capsule input, such as "Secondary capsule input". (S17)

The second capsule input selection screen S17 and S18 can display an input box menu and a non-input menu together with a phrase such as "Second capsule input" and an image such as "?", and borders of the images can be displayed with a blue color, and also, borders of phrases such as "Secondary capsule input", the input box menu, and the non-input menu may not be displayed with a blue color. (S17)

If the user selects the image such as "?", the user interface can display an explanatory phrase explaining the secondary capsule input and a guide phrase for guiding the secondary capsule input together, and the user interface can further display a confirmation menu. (S18)

An example of the explanatory phrase can be a phrase indicating information according to the input of hop capsules or flavor capsules, such as "I can make my own beer with an emphasis on hop/flavor aroma".

An example of the guide phrase can be a phrase guiding items to be prepared by the user when the user selects the secondary capsule input, such as "Please prepare separate capsule to be additionally inputted".

When the user inputs the confirmation menu through the secondary capsule input selection screens S17 and S18, the user interface can display the storage method selection screen S19.

The storage method selection screen S19 can display both the storage menu in homebrew and the storage menu in the separate container and can also display a phrase such as "storage method after the fermentation".

In the homebrew, the storage menu can be a menu for selecting whether or not to keep the beverage in the beverage maker, and the storage menu in the separate container can be a menu for selecting whether or not to store the beverage in the separate container.

When the user selects whether to store the beverage in the separate container, the condition input screens S14, S15, S16, S17, S18, S19, S20, and S21 can further include a selection screen S20 and an aging help screen S21.

The user interface is displayed when the condition to be stored in the separate container is selected through the condition input screens S14, S15, S16, S17, S18, S19, S20, and S21, especially through the storage method selection screen S19, the selection screen S20 that asks whether to age the beverage in the separate container can be displayed. An example of the selection screen S20 is "Do you want to be aged in the separate container?" can be displayed, and a No menu and a Yes menu can be displayed together.

In the selection screen S20, the NO menu can be set as a default setting (default focus), the border of the NO menu can be displayed with a blue color, and the border of the YES menu may not be displayed with a blue color.

The user can select the aging of the beverage in the separate container through the selection screen S20, and the user interface can display an aging help screen S21 for guiding the aging.

The user can select to age the beverage in the separate container through the input of the Yes menu.

The maturation help screen S21 can display help such as, please prepare the pressure-resistant container that is used exclusively for beer and sugar before completion and display a confirmation menu together with the help.

If storage is input in the homebrew on the storage method selection screen S19, or the user inputs the confirmation menu of the maturation help screen S21, the input of the conditions of the expert mode can be completed.

When the input of the conditions of the expert mode is completed, the user interface can display a confirmation screen S22 for confirming the conditions of the expert mode to the user.

When the storing is input in the homebrew, the user interface can display the confirmation screen S22 for confirming the conditions of the expert mode to the user. (S19 and S22)

When the user inputs the confirmation menu of the aging help screen S21, the user interface can display the confirmation screen S22 for confirming the conditions of the expert mode to the user. (S21 and S22)

The confirmation screen S22 can be a screen displaying the input conditions of the expert mode, for example, recipe IPA, fermentation temperature: 12, an acidity level, capsule input: 2 times, brewing after the fermentation: in homebrew together with the completion, the input result can be displayed on the condition input screen S14, S15, S16, S17, S18, S19, S20, and S21.

The user can confirm the input conditions inputted by the user through the confirmation screen S22.

The confirmation screen S22 can further include a confirmation menu, and when the user inputs the confirmation menu, all inputs to the expert mode illustrated in FIG. 8 can be completed.

As described above, when the expert mode is input, the beverage maker can sequentially perform a water supply process (S200), a fermentation tank cooling process (S300), an air supply process (S400), an additive input process (S500), an ingredient supplier residual water removal process (S600), and a fermentation process (S700').

When the expert mode is input, the beverage maker can perform a water supply process (S200), a fermentation cooling process (S300), an air supply process (S400), an additive input process (S500), an ingredient supplier residual water removal process (S600) as in the simple mode and also can perform a fermentation process (S700').

The fermentation process (S700') in the expert mode can be the same as the primary fermentation process (S700) of the fermentation processes (S700 and S800) in the simple mode, but can be performed for a longer time than the primary fermentation process (S700) in the simple mode.

When the fermentation process (S700') is completed, the beverage maker in the expert mode can perform a bottling process (S800'), and the bottling process (S800') performed after completion of the fermentation in the expert mode will be described with reference to FIG. 9.

Figure 9:
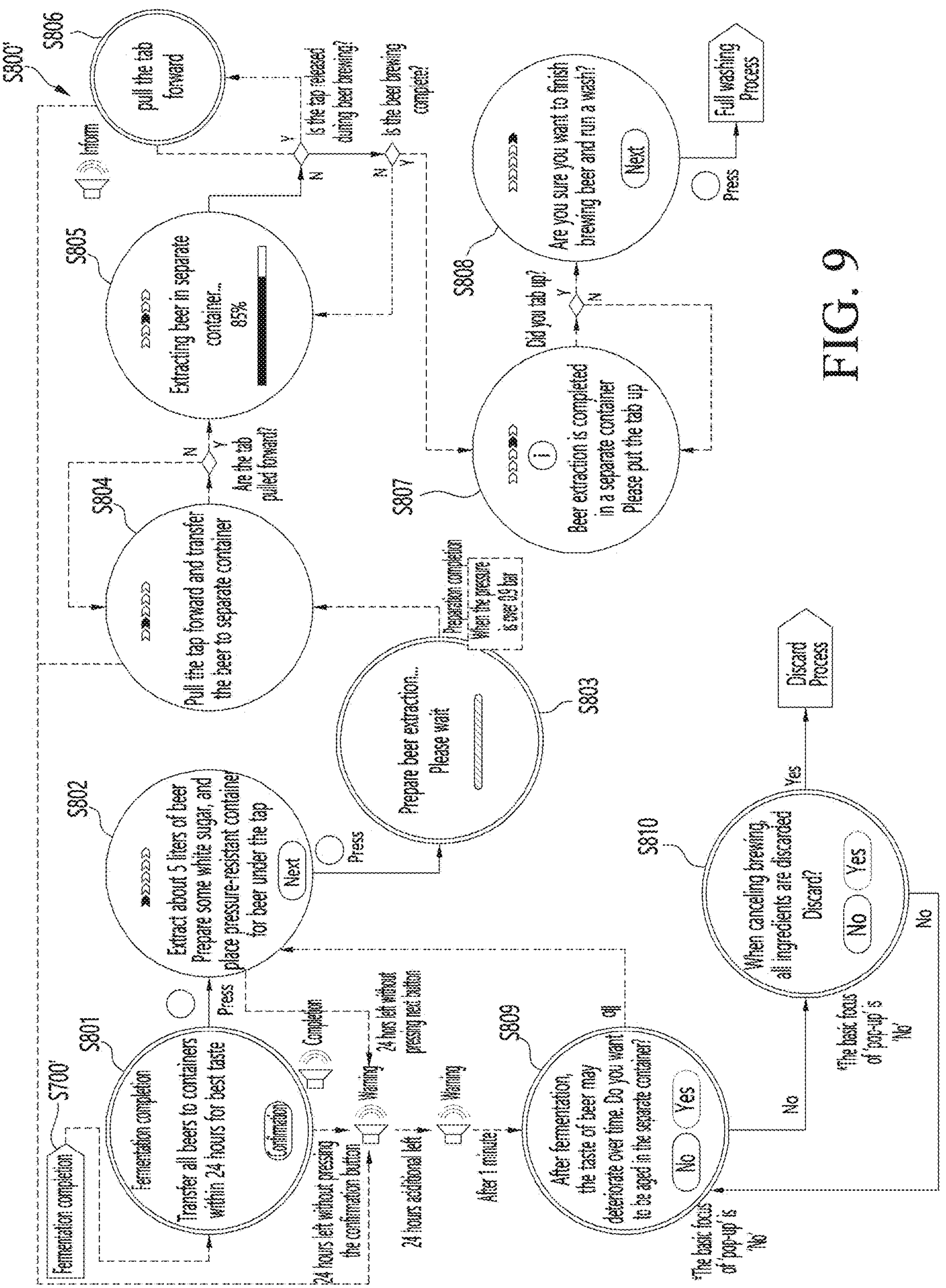
FIG. 9 is a view illustrating an example of the user interface from which a beverage is extracted in the expert mode in the system for making the beverage.

FIG. 9 is a view illustrating the user interface from which the beverage is extracted in the expert mode in the system for making the beverage.

When the fermentation process in the expert mode (S700', see FIG. 7B) is completed, the user interface can display the fermentation completion screen (S801) guiding the beverage to be transferred to the separate container.

The fermentation completion screen S801 can display a phrase of the fermentation completion and can display a guide phrase requesting to transfer the beverage to the separate container.

An example of the guide phrase can be a phrase requesting the user to start a bottling mode in the expert mode, such as "Please re-contain all beer within 24 hours for the best taste".

The fermentation completion screen S801 can further include a confirmation menu. A border of the confirmation menu can have a blue color.

The system for making the beverage can output a sound of completion through an output unit such as a speaker or a buzzer while displaying the guide phrase.

When the fermentation completion screen S801 is confirmed, the user interface can display dispensing guide screens S802, S803, S804, S805, and S806 for guiding the dispensing of the beverage.

When the user inputs the confirmation menu of the fermentation completion screen S801, the user interface can sequentially display the plurality of dispensing guide screens S802, S803, S804, S805, and S806.

The plurality of dispensing guide screens S802, S803, S804, S805, and S806 can include a first dispensing guide screen S802, a second dispensing guide screen S803, a third dispensing guide screen S804, a fourth dispensing guide screen S805, a fifth dispensing guide screen S806, and a sixth dispensing guide screen S806.

When the user inputs the confirmation menu of the fermentation completion screen S801, the first dispensing guide screen S802 can be displayed.

The first dispensing guide screen S802 can include a phrase asking the user to inform a dispensing amount of the beverage, and an example of such a phrase can be a phrase such as "to extract about 5 liters of beer."

The first dispensing guide screen S802 can include a phrase requesting the user to place the separate container under the beverage dispenser 6. An example of such a phrase can be "Prepare sugar, and please place pressure-resistant container used exclusively for beer below the tap", and the first dispensing guide screen S802 can request an action to be performed by the user before dispensing the beverage.

The first dispensing guide screen S802 can include a next menu. A border of the next menu can have a blue color.

When the user inputs the next menu on the first dispensing guide screen S802, the first dispensing guide screen S802 can be changed to the second dispensing guide screen S803.

The second dispensing guide screen S803 can display a phrase indicating that beer extraction is being prepared, and an example of such a phrase can be a phrase such as "Beer extraction is being prepared . . . please wait a moment".

The second dispensing guide screen S803 can be displayed while the beverage maker prepares the beverage extraction, and when the preparation for beverage extraction is completed, the second dispensing guide screen S803 can be changed to the third dispensing guide screen S804.

The third dispensing guide screen S804 can display a phrase requesting the user to operate the dispenser 62 in an open mode, and an example of such a phrase can be a phrase such as "Pull the tab forward to transfer the beer to the separate container".

When the user pulls the tab forward, the dispenser 62 can extract the beverage into the separate container, and the third dispensing guide screen S804 can be changed to the fourth dispensing guide screen 805.

The fourth dispensing guide screen 805 can display a phrase indicating that beer is being extracted, and an example of such a phrase can be a phrase such as "Beer being extracted into the separate container . . . ".

The fourth dispensing guide screen S805 can display an amount of beverage that is completely dispensed. The fourth dispensing guide screen S805 can display the amount of dispensed beverage as a percentage (e.g., about 85%) image.

If the user sets the tap 620 to a close mode while the user interface displays the fourth dispensing guide screen S805, the fourth dispensing guide screen S805 can be changed to the fifth dispensing guide screen S806.

The fifth dispensing guide screen S806 can display a phrase requesting the user to operate the dispenser 62 in the open mode, and an example of such a phrase can be a phrase such as "Pull the tab forward".

If the beverage extraction is not completed while the user interface displays the fourth dispensing guide screen S805 or the fifth dispensing guide screen S806, the user interface can display the fourth dispensing guide screen S805 or the fifth dispensing guide screen S806.

If the beverage extraction is completed while the user interface displays the fourth dispensing guide screen S805 or the fifth dispensing guide screen S806, the fourth dispensing guide screen S805 or the fifth dispensing guide screen S806 can be changed to the sixth dispensing guide screen S807.

The sixth dispensing guide screen S807 can display a phrase indicating the completion of the beverage extraction, and an example of such a phrase can be a phrase such as "Beer extraction has been completed in the separate container."

The sixth dispensing guide screen S807 can display a phrase requesting an operation of the dispenser 62 in the close mode, and an example of such a phrase can be a phrase such as "Please lift the tab upward."

After the sixth dispensing guide screen S807 is displayed, if the user operates the tap 620 in the close mode, the sixth dispensing guide screen S807 can be changed to a washing start screen S808.

The washing start screen S808 can display a phrase indicating whether to start a washing mode, and an example of such a phrase can be a phrase such as "After pouring beer, I will perform washing."

The washing start screen S808 can display the next menu, and when the user inputs the next menu, the beverage maker can perform the washing mode.

If the confirmation menu is not input while the user interface displays the fermentation completion screen S801, and a set time period (e.g., about 24 hours) elapses, the system for making the beverage will give a warning through an output such as the speaker or buzzer.

If the next menu is not input while the user interface displays the first dispensing guide screen S802 and the set time period (e.g., 24 hours) elapses, the system for making the beverage will give a warning through an output such as the speaker or buzzer.

If the tap 620 is not operated in the open mode while the user interface displays the third dispensing guide screen S804 and the set time period (e.g., about 24 hours) elapses, the system for making the beverage will give a warning through the output such as the speaker or buzzer.

If the tap 620 is not operated in the open mode while the user interface displays the fifth dispensing guide screen S806 and the set time period (e.g., about 24 hours) elapses, the system for making the beverage will give a warning through the output such as the speaker or buzzer.

As described above, after the system for making the beverage gives warning through the output unit such as the speaker or buzzer and then left for an additional set time period (e.g., about 24 hours), the system for making the beverage can give a warning again through the output unit such as the speaker or buzzer.

The system for making the beverage can give a warn again through the output such as the speaker or buzzer, and after a shorter time period (e.g., about 1 minute) than the set time period (e.g., about 24 hours), the user interface can display possibility of abnormality of the beverage and can display an inquiry screen S809 asking whether to transfer the beverage to the separate container and then age the beverage.

The inquiry screen S809 can display a phrase indicating the possibility of abnormality of the beverage, and an example of such a phrase can be the phrase "Beer taste can be abnormal over time after the fermentation".

The inquiry screen S809 can display a phrase indicating whether or not to age, and an example of such a phrase can be a phrase such as, "Shall we age the beer after transferred in a separate container?" The inquiry screen can include a No menu and a Yes menu.

When the user inputs the Yes menu, the user interface can sequentially display the plurality of dispensing guide screens S802, S803, S804, S805, and S806.

If the user inputs the No menu, the inquiry screen S809 can be changed to a disposal inquiry screen S810 for inquiring whether or not to discard the beverage.

The disposal inquiry screen S810 can display a phrase requesting discard of the beverage, an example of such a phrase is "If brewing is canceled, all ingredients will be discarded". That is, it can be a phrase such as "Would you like to discard it?".

The discard inquiry screen S810 can include a No menu and a Yes menu.

If the user inputs the Yes menu, the beverage maker can perform the discard process, and the beverage can be discarded by the user.

If the user inputs the No menu, the user interface can change the discard inquiry screen S810 to the inquiry screen S809.

Figure 10:
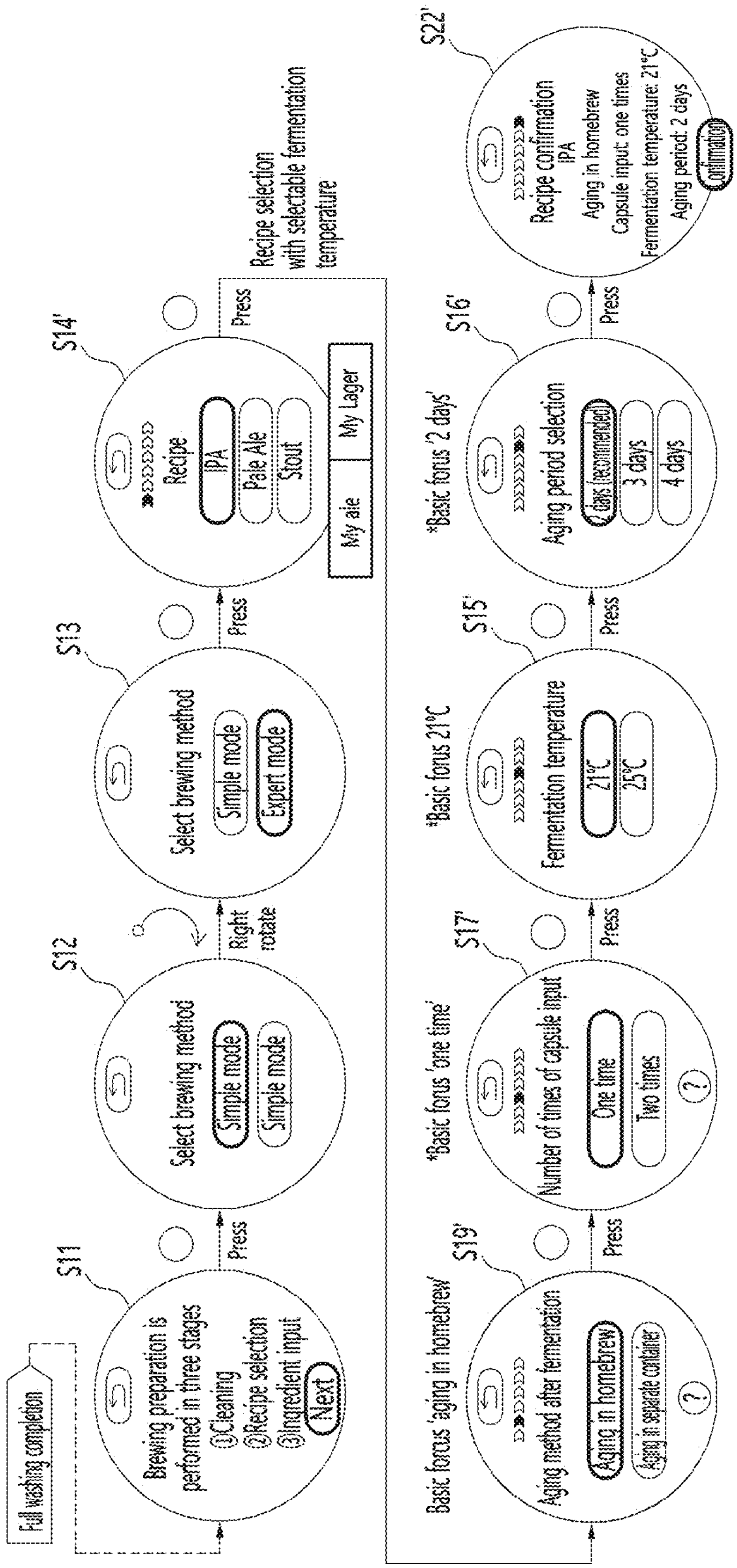
FIG. 10 is a view illustrating an example of the user interface into which the expert mode is inputted.

FIG. 10 is a view illustrating another example of the user interface into which the expert mode is inputted.

Referring to FIG. 10 for another example of the user interface, mode selection screens S11, S12, and S13 in which the simple mode and the expert mode are selectively input can be displayed.

When the cleaning (cleaning process (S100)) is completed, the display can display mode selection screens S11, S12, and S13 for selecting the simple mode and the expert mode.

The mode selection screens S11, S12, and S13 can include a menu display screen S11 and brewing method selection screens S12 and S13, and since the mode selection screen S11, S12, and S13 are the same as or similar to those in the example of the user interface illustrated in FIG. 8, detailed descriptions thereof will be omitted to avoid redundant description.

As another example of the user interface, the user interface can display condition input screens S14', S15', S16', S17', and S19' for inputting conditions of the expert mode.

As another example of the user interface, a plurality of condition input screens S14', S19', S17', S15', and S16' can be sequentially displayed, and an order of the plurality of condition input screens S14', S19', S17', S15', and S16' can be variously combined.

An example of the plurality of condition input screens S14', S19', S17', S15', and S16' can include a recipe selection screen S14', an aging method selection screen S19', a capsule injection number selection screen S17', a fermentation temperature selection screen S15', and an aging period selection screen S16'.

The recipe selection screen S14' can display a plurality of beverage types and display a plurality of beverage menus together. For example, the recipe selection screen S14 can display an IPA menu, a pale ale menu, and a stout menu, my ale menu, my lager menu, a spicy IPA menu, and the like together.

In the recipe selection screen S14', a border of one menu can be displayed with a blue color, and a border of another menu may not be displayed with a blue color. The recipe selection screen S14 can display a phrase inducing selection of a recipe, such as "recipe selection".

Some of the plurality of beverage menus displayed on the recipe selection screen S14' can be menus (i.e., normal menus) displayed on the user interface regardless of upgrade. For example, the IPA menu, the pale ale menu, and the stout menu can be normal menus displayed regardless of the upgrade.

Among the plurality of beverage menus displayed on the recipe selection screen S14', the rest can be menus (i.e., upgrade menus) displayed on the user interface only in the case of the upgraded beverage maker 300. The my ale menu, the my lager menu, and the spicy IPA menu can be upgrade menus.

The normal mode and the expert mode can be pre-stored modes in the beverage maker 300, and the upgrade menus (special menu and my menu) such as the my ale menu, the my lager menu, and the spicy IPA menu are pre-stored in the beverage maker 300 or can be a menu upgraded through application update of the mobile terminal 500. The user can select the upgrade menu (special menu and my menu) in the normal mode and can select the upgrade menu (special menu and my menu) in the expert mode.

My ale and my lager can be special menus and be made as my own by freely combining beer ingredients (wort, yeast, hop oil, or flavor) by the customer in addition to the standardized capsule packages, and an algorithm that is capable of being selected during the brewing in the beer maker can be applied. The customer can optimize and apply any combination of the ingredients by this brewing algorithm to make beer.

That is, the beverage maker can make my own ale beer by selecting the beer ingredients, and the my-own ale beer can be made by selecting malt, hops, and flavor. In addition, the user (customer) can enjoy beer (ale/lager) in a new style by various combinations of the wort and capsules.

When the user selects one of the plurality of beverage menus, the user interface can display the aging method selection screen S19'.

The aging method selection screen S19' can display both the aging menu in homebrew and the aging menu in the separate container and can also display a phrase such as "the aging method after the fermentation".

In the aging method selection screen S19', a border of the aging menu can be displayed with a blue color in the homebrew, and a border of the aging menu may not be displayed with a blue color in the separate container. (S19')

When the user selects the aging menu in the homebrew, the user interface can display a capsule input number selection screen S17'.

The capsule input number selection screen S17' can display a one-time menu and a two-time menu together with phrases such as a capsule input number and can also display an image such as "?". In the capsule input number selection screen S17', a border of the one-time menu can be displayed with a blue color, and a border of the two-time menu may not be displayed with a blue color.

When the user selects the first-time menu or the two-time menu, the user interface can display a fermentation temperature selection screen (S15').

The fermentation temperature selection screen S15' can display a plurality of temperature menus together. For example, the fermentation temperature selection screen S15' can display a 21° C. menu and a 25° C. menu together with a phrase such as "fermentation temperature". In the fermentation temperature selection screen S15', a border of one temperature menu can be displayed with a blue color, and a border of another temperature menu may not be displayed with a blue color.

When the user selects one of the plurality of temperature menus, the user interface can display the aging period selection screen S16'.

The aging period selection screen S16' can display a plurality of aging periods and display a plurality of aging period menus together.

For example, the aging period selection screen S16 can display a 2-day menu, a 3-day menu, and a 4-day menu together. In the aging period selection screen S16', a border of one aging period menu can be displayed differently from a border of the other aging period menus. In the aging period selection screen S16', a phrase such as "Recommended" can be displayed next to any one aging period menu.

When the user selects one of the plurality of aging period menus, an input of the conditions of the expert mode can be completed.

When the input of the conditions of the expert mode is completed, the user interface can display a confirmation screen S22' for confirming the conditions of the expert mode to the user.

When the aging is input in the homebrew, the user interface can display the confirmation screen S22 for confirming the conditions of the expert mode to the user. (S16' and S22')

The confirmation screen S22' can be a screen displaying the input conditions of the expert mode. For example, the condition input screen S14', S19', S17', S15', and S16' can display the input results.

The user can confirm the input conditions inputted by the user through the confirmation screen S22.

The confirmation screen S22 can further include a confirmation menu, and when the user inputs the confirmation menu, all inputs to the expert mode illustrated in FIG. 8 can be completed.

As another example of the user interface, a plurality of condition input screens S14', S15', S16', S17', and S19' differently depending on whether or not to be upgraded can be displayed.

Some of the plurality of condition input screens S14', S19', S17', S15', and S16' can be screens (i.e., normal screens) displayed on the user interface regardless of the upgrade. For example, a recipe selection screen S14', an aging method selection screen S19', and a capsule input count selection screen S17' can be sequentially displayed on the user interface regardless of the upgrade.

The rest of the plurality of condition input screens S14', S19', S17', S15', and S16' can be screens displayed on the user interface only in the case of the upgraded beverage maker 300 (i.e., the upgrade screen). For example, the fermentation temperature selection screen S15' and the aging period selection screen S16' can be sequentially displayed after the general screen only in the case of the upgraded beverage maker 300.

When the beverage maker 300 is not upgraded, the user interface can display a confirmation screen S22' after the normal screens S14', S19', and S17'.

Figure 11:
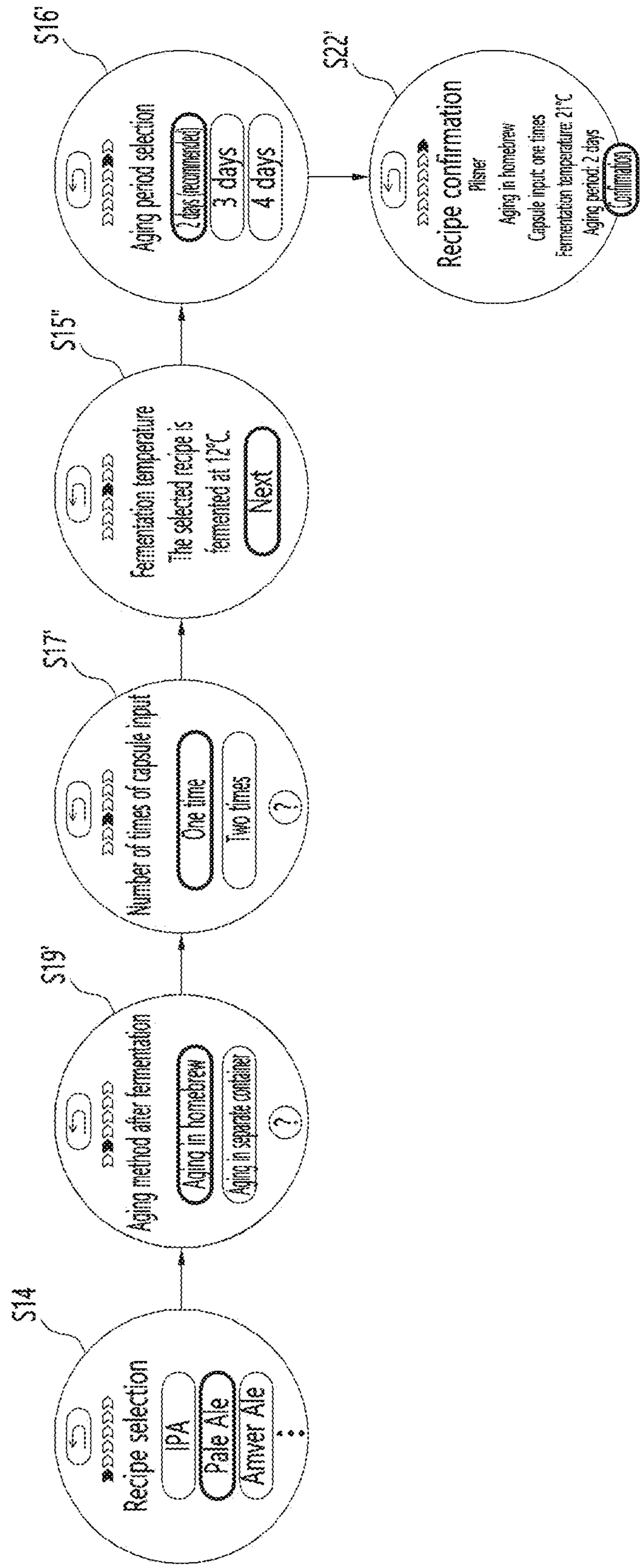
FIG. 11 is a view illustrating an example in which a recipe having a fixed fermentation temperature is selected through the user interface.

FIG. 11 is a view illustrating an example in which a recipe having a fixed fermentation temperature is selected through the user interface.

When a recipe with a fixed fermentation temperature is selected, as illustrated in FIG. 11, the user interface can display a plurality of condition input screens S14, S19', S17', S15", and S16', and then, a confirmation screen S22' can be displayed.

The plurality of condition input screens S14, S19', S17', S15", and S16' can include a recipe selection screen S14, an aging method selection screen S19', a capsule injection number selection screen S17', a fermentation temperature guide screen S15", and an aging period selection screen S16'.

The recipe selection screen S14 can display a plurality of beverage types and display a plurality of beverage menus together. For example, the recipe selection screen S14 can display a wheat menu, a pilsner menu, an amber ale menu, and the like together.

In the recipe selection screen S14, a border of one menu can be displayed with a blue color, and a border of another menu may not be displayed with a blue color. The recipe selection screen S14 can display a phrase inducing selection of a recipe, such as "recipe".

When the user selects one of the plurality of drink menus, the user interface can display an aging method selection screen S19'.

In the aging method selection screen S19', a border of the aging menu can be displayed with a blue color in the homebrew, and a border of the aging menu may not be displayed with a blue color in the separate container. (S19')

When the user selects the aging menu in the homebrew, the user interface can display a capsule input number selection screen S17'.

The capsule input number selection screen S17' can display a one-time menu and a two-time menu together with phrases such as a capsule input number and can also display an image such as "?". In the capsule input number selection screen S17', a border of the one-time menu can be displayed with a blue color, and a border of the two-time menu may not be displayed with a blue color.

When the user selects the one-time menu or the two-time menu, the user interface can display a fermentation temperature guide screen S15".

The fermentation temperature guide screen S15" can display a phrase indicating a fermentation temperature of the beverage menu selected on the recipe selection screen S14 and the next menu together, for example, can display a phrase such as "The selected recipe is fermented at a temperature of 12° C.".

When the user inputs the next menu, the user interface can display an aging period selection screen S16'.

The aging period selection screen S16' can display a plurality of aging periods and display a plurality of aging period menus together.

For example, the aging period selection screen S16 can display a 2-day menu, a 3-day menu, and a 4-day menu together. In the aging period selection screen S16', a border of one aging period menu can be displayed differently from a border of the other aging period menus. In the aging period selection screen S16', a phrase such as "Recommended" can be displayed next to any one aging period menu.

When the user selects one of the plurality of aging period menus, the plurality of condition input screens S14, S19', S17', S15", and S16' can all be completed, and the confirmation screen S22' can be displayed.

The confirmation screen S22' can be a screen that displays the selected recipe when the recipe with the fixed fermentation temperature is selected. For example, results inputted on the condition input screens S14, S19', S17', S15", and S16' such as the type of beverage (pilsner when the pilsner menu is selected), aging in the homebrew, and capsule injection once, a fermentation temperature: 12° C., and an aging period of 2 days.

The user can confirm the input conditions inputted by the user through the confirmation screen S22'.

The confirmation screen S22' can further include a confirmation menu, and when the user inputs the confirmation menu, the display of the user interface when the recipe with the fixed fermentation temperature is selected can be completed.

As described above, when the fermentation temperature is fixed, a separate fixed fermentation temperature can be provided according to the selected precondition. Therefore, the fermentation temperature guide screen S15" can display the temperature that is variably according to the selected recipe and whether or not to be aged in the separate container.

Figure 12:
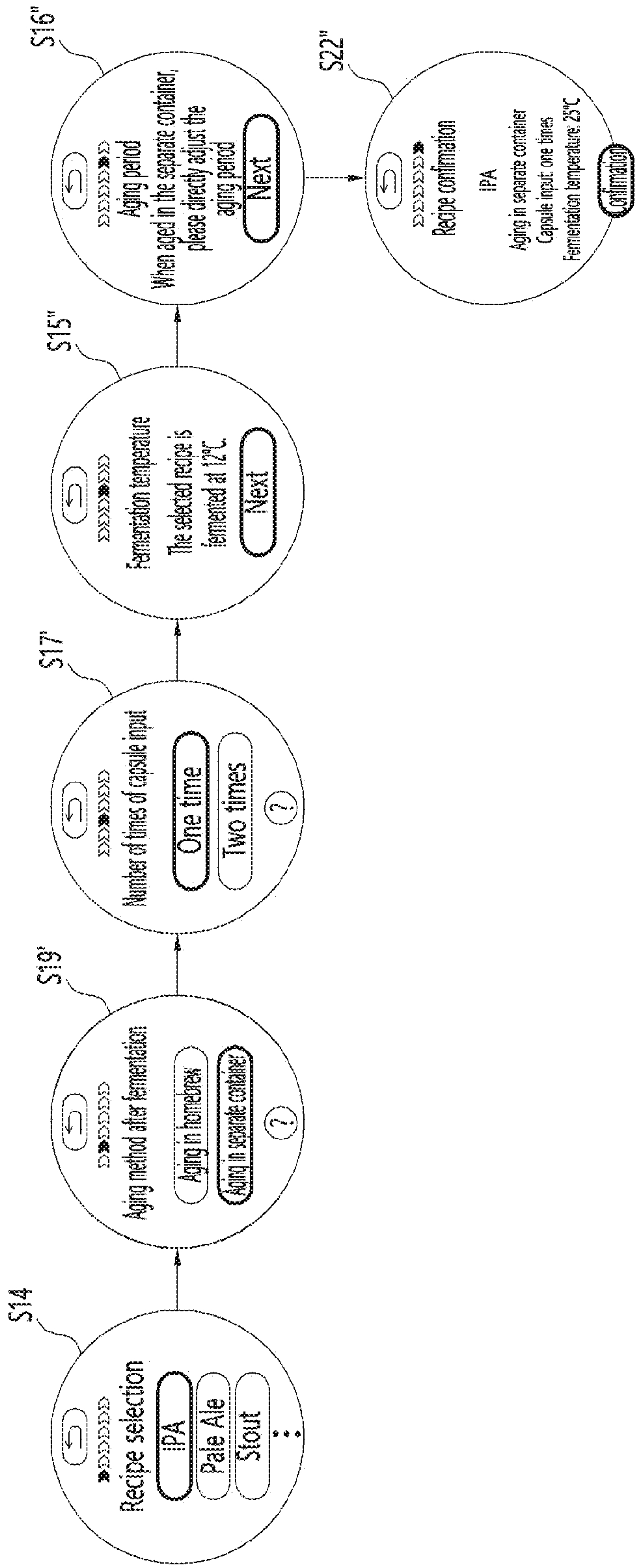
FIG. 12 is a view illustrating an example of selecting separate container aging through the user interface.

FIG. 12 is a view illustrating an example of selecting separate container aging through the user interface.

When aged in the separate container is selected, as illustrated in FIG. 12, the user interface can display a plurality of condition input screens S14, S19', S17', S15", and S16", and then, a confirmation screen S22' can be displayed.

The plurality of condition input screens S14, S19', S17', S15", and S16" can include a recipe selection screen S14, an aging method selection screen S19', a capsule injection number selection screen S17', a fermentation temperature guide screen S15", and an aging guide screen S16".

The recipe selection screen S14 can display a plurality of beverage types and display a plurality of beverage menus together. For example, the recipe selection screen S14 can display an IPA menu, a pale ale menu, and a stout menu together.

In the recipe selection screen S14, a border of one menu can be displayed with a blue color, and a border of another menu may not be displayed with a blue color. The recipe selection screen S14 can also display a phrase inducing selection of a recipe, such as "recipe".

When the user selects one of the plurality of drink menus, the user interface can display an aging method selection screen S19'.

The aging method selection screen S19' can display both the aging menu in the homebrew and the aging menu in the separate container. (S19')

When the user selects the aging menu in the separate container, the user interface can display a capsule input number selection screen S17'.

The capsule input number selection screen S17' can display a one-time menu and a two-time menu together with phrases such as a capsule input number and can also display an image such as "?". In the capsule input number selection screen S17', a border of the one-time menu can be displayed with a blue color, and a border of the two-time menu may not be displayed with a blue color.

When the user selects the one-time menu or the two-time menu, the user interface can display a fermentation temperature guide screen S15".

The fermentation temperature guide screen S15" can display a phrase indicating a fermentation temperature of the beverage menu selected on the recipe selection screen S14 and the next menu together, for example, can display a phrase such as "The selected recipe is fermented at a temperature of 25° C.".

When the user inputs the next menu, the user interface can display an aging guide screen S16".

The aging guide screen S16" can display a phrase that guides a point to be aware of when aged in the separate container and the next menu, for example, "Please directly adjust the aging period when aged in the separate container . . . " can be displayed.

When the user selects the next menu, the plurality of condition input screens S14, S19', S17', S15", and S16" can all be completed, and the confirmation screen S22" can be displayed.

The confirmation screen S22' can be a screen that displays the selected recipe when aging in a separate container is selected. For example, results inputted on the condition input screens S14, S19', S17', S15", and S16" such as the type of beverage (IPA when the IPA menu is selected), aging in the separate container, and capsule injection once, a fermentation temperature: 25° C., and an aging period.

That is, when aged in the separate container is selected, the fermentation temperature is fixed, the aging period may not be set, and the aging guide screen S16" can be provided.

The system for making the beverage can shorten the beverage making period by increasing in fermentation temperature or fermentation pressure or increasing in aging period in addition to the above implementations.

The system for making the beverage can also shorten the beverage making period by increasing a fermentation temperature or fermentation pressure or increasing an aging period. In some implementations, it is also possible to implement a separate beverage making period reduction mode (or speed mode).

An example of shortening the beverage making period can be a method of increasing in temperature and pressure such as an increase in ale temperature (existing algorithm temperature rise of around 20%), an addition of a limit for the entire recipe making period, and a change in primary fermentation end standard (applying only ale, increase of about 0.05 compared to the existing algorithm).

Another example of shortening the beverage production period can be a method of increasing in aging period, such as an addition of a limit on the ale making period (about 10 days for ales) and increasing in ale aging period (36 hours→48 hours).

In addition, the system for making the beverage can update the expert mode, the my ale menu, the my lager menu, the upgrade menu such as the spicy IPA menu, the beverage making period reduction mode (or speed mode), etc. through the application of the mobile terminal 500 to provide convenience to the user.

In some implementations, a user can make the beverage using various recipes as well as pre-stored recipes.

In addition, since the beverage maker takes a short time to make the beverage in the expert mode, the beverage maker can make a large amount of beverage more quickly.

The above-disclosed subject matter is to be considered illustrative, and not restrictive, and the appended claims are intended to cover all such modifications, enhancements, and other implementations, which fall within the true spirit and scope of the present disclosure.

The implementations described above are to be considered illustrative, and not restrictive, and the technical spirit of the present disclosure is not limited to the foregoing implementations.

Therefore, the scope of the present disclosure is defined not by the detailed description of the disclosure but by the appended claims, and all differences within the scope will be construed as being included in the present disclosure.

What is claimed is:

1. A system for making a beverage, the system comprising:

a beverage maker comprising:

a fermentation tank configured to accommodate the beverage, a temperature regulator configured to regulate a temperature of the fermentation tank, and a beverage dispenser configured to dispense the beverage from the fermentation tank to an outside of the fermentation tank;

a user interface configured to communicate with the beverage maker and to receive input from a user among (i) a simple mode configured to make the beverage within a first making time and (ii) an expert mode configured to make the beverage within a second making time that is less than the first making time; and a controller configured to control the beverage maker to selectively perform the simple mode and the expert mode based on the input received through the user interface, wherein the controller is configured to:

based on the simple mode being selected, control the beverage dispenser to dispense the beverage after a first fermentation process and an aging process are sequentially performed, and based on the expert mode being selected, transfer the beverage to a container without any aging process after a second fermentation process is performed.

2. The system according to claim 1, wherein the first fermentation process is performed in the simple mode for a first fermentation process time; and wherein the second fermentation process is performed in the expert mode for a second fermentation process time that is less than the first fermentation process time.

3. The system according to claim 1, wherein the user interface comprises a display configured to display a mode selection screen configured to receive the input among the simple mode and the expert mode.

4. The system according to claim 3, wherein the display is configured to, based on the expert mode being selected, display a condition input screen configured to receive input of one or more conditions of the expert mode.

5. The system according to claim 4, wherein the display is configured to, based on a condition for storing the beverage in a separate container being selected through the condition input screen, display a selection screen configured to receive input of whether to age the beverage in the separate container.

6. The system according to claim 5, wherein the display is configured to, based on receiving input to age the beverage in the separate container through the selection screen, display an aging help screen indicating the aging process of the beverage.

7. The system according to claim 6, wherein the display is configured to, based on a confirmation menu being selected through the aging help screen, display a confirmation screen notifying the user to confirm the one or more conditions of the expert mode.

8. The system according to claim 4, wherein the one or more conditions include a condition for storing the beverage in the beverage maker, and wherein the display is configured to, based on the condition for storing the beverage in the beverage maker being selected, display a confirmation screen notifying the user to confirm the one or more conditions of the expert mode.

9. The system according to claim 1, wherein the user interface is configured to, based on a fermentation process of the expert mode being completed, display a fermentation completion screen notifying the user to transfer the beverage to a separate container.

10. The system according to claim 9, wherein the user interface is configured to, based on receiving a confirmation input on the fermentation completion screen, display a dispensing guide screen indicating that the beverage is ready for dispensing.

11. The system according to claim 1, further comprising:

a mobile terminal comprising the user interface.

12. The system according to claim 11, further comprising a server configured to communicate with the mobile terminal and the beverage maker, the server being configured to receive an upgrade item transmitted through the mobile terminal, wherein the beverage maker is configured to receive the upgrade item from the server.

13. The system according to claim 12, wherein at least one of the beverage maker, the mobile terminal, or the server comprises the controller.

14. The system according to claim 1, further comprising:

an ingredient supplier configured to accommodate one or more beverage ingredients; and a water supply configured to supply water to the ingredient supplier, wherein the fermentation tank is configured to receive the water through the ingredient supplier.

15. The system according to claim 14, further comprising a plurality of channels that connect the water supply, the ingredient supplier, the fermentation tank, and the beverage dispenser.

16. The system according to claim 15, further comprising a plurality of valves disposed at one or more of the plurality of channels.

17. The system according to claim 1, wherein the temperature regulator comprises at least one of a refrigerating device or a heater.

18. The system according to claim 1, wherein the first fermentation process comprises performing (i) a first primary fermentation for a first primary fermentation time and (ii) a secondary fermentation for a secondary fermentation time, wherein the second fermentation process comprises performing a second primary fermentation for a second primary fermentation time, and wherein the second primary fermentation time is greater than the first primary fermentation time and less than a sum of the first primary fermentation time and the secondary fermentation time.

19. A system for making a beverage, the system comprising:

a fermentation tank configured to accommodate the beverage;

a temperature regulator configured to regulate a temperature of the fermentation tank;

a beverage dispenser configured to dispense the beverage from the fermentation tank to an outside of the fermentation tank;

a user interface configured to receive input from a user among (i) a simple mode configured to make the beverage within a first making time and (ii) an expert mode configured to make the beverage within a second making time that is less than the first making time; and a controller configured to selectively perform the simple mode and the expert mode based on the input received through the user interface, wherein the controller is configured to:

based on the simple mode being selected, perform a first fermentation process, wherein the first fermentation process comprises performing (i) a first primary fermentation for a first primary fermentation time and (ii) a secondary fermentation for a secondary fermentation time, and based on the expert mode being selected, perform a second fermentation process comprising performing a second primary fermentation for a second primary fermentation time, and wherein the second primary fermentation time is greater than the first primary fermentation time and less than a sum of the first primary fermentation time and the secondary fermentation time.

* * * * *